United States Patent [19]
Nishino

[11] Patent Number: 5,659,908
[45] Date of Patent: Aug. 26, 1997

[54] AIR MAT AND METHOD FOR MANUFACTURING THE MAT

[76] Inventor: Toshio Nishino, 1-7-8-301, Shimoosanaka Nakahara-ku, Kawasaki-shi, Kanagawa-ken, Japan

[21] Appl. No.: 359,056

[22] Filed: Dec. 19, 1994

[30] Foreign Application Priority Data

Dec. 27, 1993 [JP] Japan .................... 5-354083
Apr. 14, 1994 [JP] Japan .................... 6-005318
May 17, 1994 [JP] Japan .................... 6-127021

[51] Int. Cl.$^6$ .................... A47C 27/08; A47C 27/10
[52] U.S. Cl. .................... 5/676; 5/710
[58] Field of Search .................... 5/453, 455, 456, 5/457, 459, 449, 932, 309

[56] References Cited

U.S. PATENT DOCUMENTS

| | | | |
|---|---|---|---|
| 2,777,490 | 1/1957 | Munk | 383/66 |
| 4,797,962 | 1/1989 | Goode | 5/455 |
| 4,908,895 | 3/1990 | Walker | 5/457 |
| 5,090,076 | 2/1992 | Guldager | 5/453 |
| 5,090,077 | 2/1992 | Coden et al. | 5/453 |
| 5,249,319 | 10/1993 | Higgs | 5/449 |

FOREIGN PATENT DOCUMENTS

| | | | |
|---|---|---|---|
| 3320771 | 12/1984 | Germany | 5/469 |
| 2224644 | 5/1990 | United Kingdom | 5/449 |

*Primary Examiner*—Steven N. Meyers
*Assistant Examiner*—Robert G. Santos
*Attorney, Agent, or Firm*—Koda and Androlia

[57] ABSTRACT

An air mat comprising an air mat body constructed by two sheets of outside and rearside respectively made of soft non-ventilation synthetic resin sheets and a plurality of forming partition sheets, and various parts welded to the air mat, such as air supply and exhaustion taps an automatic pressure controllers. A swelled condition of a plurality of air chambers formed by the partition sheets is held under the atmosphere or under a supporting pressure previously set. The air mat is manufacture by various steps including a welding step in which respective partition sheets and the outside and rearside sheets are simultaneously welded by upper and lower electrodes of a double high frequency welding machine.

2 Claims, 21 Drawing Sheets

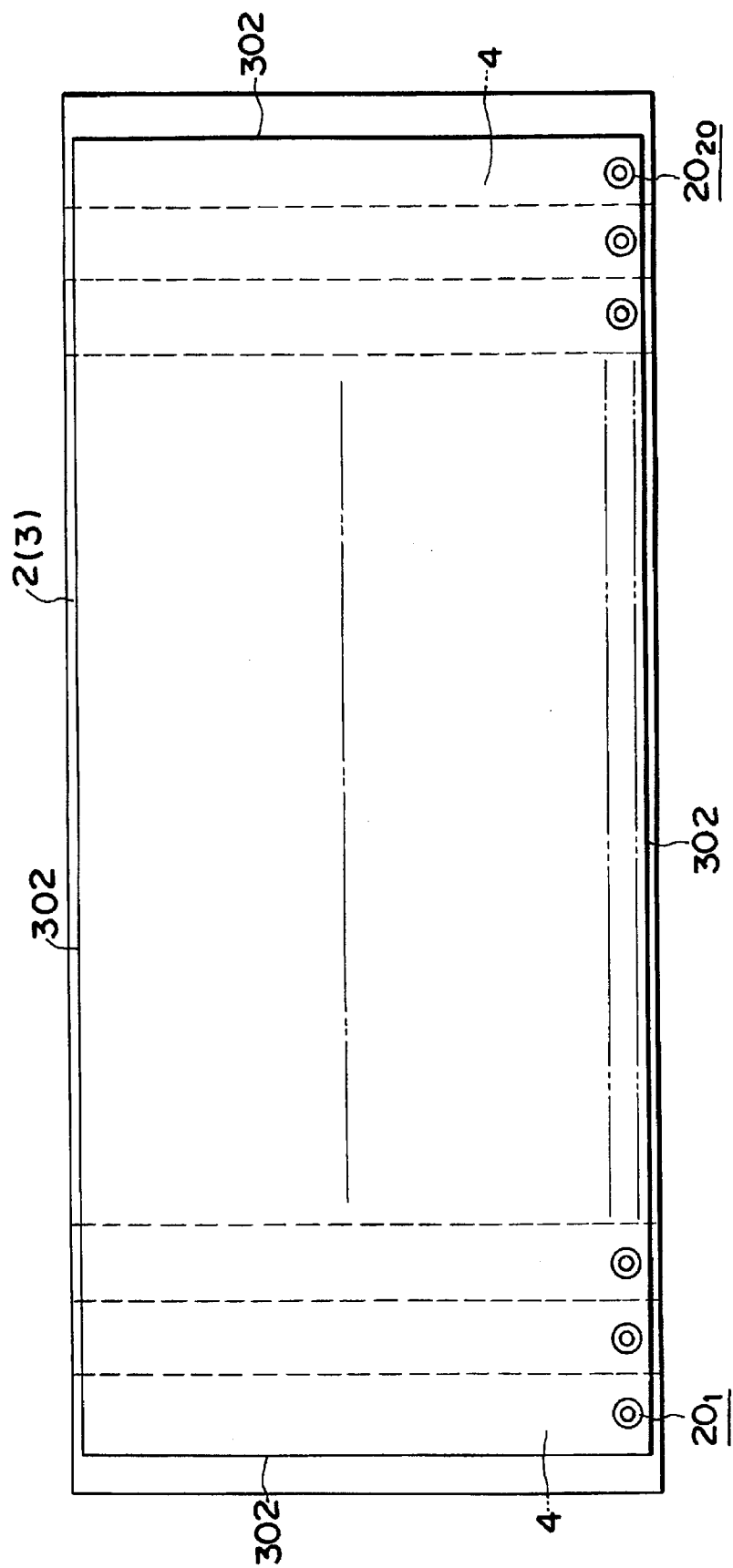

AIR MAT AND METHOD FOR MANUFACTURING THE MAT

DETAILED EXPLANATION OF THE INVENTION

Background of the Invention

The present invention relates to air mats for sound sleeping, preventing bedsores, and outdoor leisure time provided with partition sheet members of forming bands for keeping and holding a predetermined thickness of the mat and manufactured of soft vinyl chloride sheets and the like by means of a high frequency welding and a method for manufacturing the air mats.

In case that the air mats are manufactured by a high frequency manufacturing method, two sheets of outside and rearside such as ordinarily of soft vinyl chloride and the like are overlapped each other on a surface plate having a thin insulation paper (for example, polyester film patched insulation paper), and an electrode mold of a predetermined band shape welds and machines these sheets of outside and rearside so as to form a number of air chambers of substantially the same thickness and arranged in series. It is called a flat type air mat. According to the cubic type air mat, number of partition sheet material of forming band are welded between the outside and rearside sheets in order to keep a fixed thickness of the air mat.

The former manufacturing method is flat and very simple, and manufactures air mate of thin when air is introduced into the product. Further, the product of air mats disadvantageously has wavy surface. While, according to the latter, it is possible to freely change a thickness of the product air-ballooned and the expanded mat has advantageously few wavy surface portions. The latter method has been carried out in a manner of cube and has the steps of welding a number of partition sheets, at a regular distance, of a width corresponding to a height (equals to a thickness of the mat when it is swelled) of the product onto an inside of the rearside sheet, winding the rearside sheet, sequentially welding other sides of the partition sheets to the outside sheets, attaching accessory parts such as air play and the like to the air mat, and last hot-stitching whole circumference of the outside and the rearside sheets completing an air mat of the product. It is noted that manufacturing method is complicated, in particular when a beg size air mat is manufactured and so many partition sheets of 15 to 25 are used, it is very difficult to manufacture such mat.

Even if the difficulties of the conventional products of air mat are solved, when pressure in the air mat is raised and the pressured product is used, it is impossible to obtain such feeling or comfortableness as that of the spring mats and water beds. As a result, the conventional air mats fail to be used in homes except for a usage as outdoor holiday-making goods.

By the way, the water bed has a considerable weight of 200 to 500 kg, and if you use the heavy water bed as it is, it likes that you sleep on a big water pillow cooling or chilling your body. Consequently, it is necessary to use an electric heater of about 250 w in order to warm water in the bed.

Additionally, it is almost impossible to use the heavy water bed in a posture other than flat, for example, in a girge (phonetic) bed. When the conventional water bed is used in horizon posture, your hip is apt to sink or lower in the bed. According to the prior art, floating power is supplied to the sinking portion of the water bed in order to raise it obtaining a good posture of the sleeper on the bed. It is of course that pressure of the sinking portion rises. Other problems of the prior art of water beds are possibility of water leakage, non-ventilation, and wave transfers in the whole structure of the conventional water mat which waves being generated due to removal of a weight of sleeper turning or tossing on the bed.

The wavy type bedsore-prevention air mats have two groups of air chambers or cylinders arranged every other one under two systems and respective groups of air chambers expand and shrink alternately. The conventional air mats of wavy type have bed feeling of usage, so they are not used to the patients of a mild case. When the patients become ones of serious illness and suffer bedsores, the patients start to use the wavy type air mats because the patient and nurse hesitate to use such troublesome air mats.

As you know, bedsores are death of the portion of the body and human senses of the portion are lost. Such bedsores are apt to generate at the body portion on which a pressure more than 30 m/m Hg for a long time is applied or at the body portion which has human sense and low pressure of a capillary. When bedsore is generated on a certain portion of the body resulting in insufficient distribution of the body weight of the sleeper or patient on the air mat, even bedsore-prevention pats are applied to the ellness portion having symptoms of bedsore, such portion resultantly spreads one after another over substantially whole body. It is noted that it i difficult to use the air mat when the mat fails to support the body weight of the patient with a pressure substantially identical with that of water beds providing a good sleep to the patient and preventing the patient from suffering the illness.

The reason that the air mat is used by only holiday-makers over the world and it is substantially not installed in an air bed resides in the essential difference between water and air in quality. Concerning water and water beds, when water is poured under no-pressure or with gravity into a flat bag without partition members therein, water naturally lowers with gravity and spreads horizontally making a horizon surface of water body in the bag. When a patient lays on his or her side or takes supine posture on the horizontal surface of the bed, a weight of the person's body raises an inner pressure of the bag generating tension along an outside cloth of the bag and a balance between the inner pressure and the weight is attained as the patient body sinks to a certain depth generating a suitable resiliency in the bag. Consequently the bag can be used as a bed.

Concerning the air mat, a flat bag is made of an outside and a rearside sheet materials. When air which doesn't have weight is introduced into the bag, the becomes a round balloon and it is impossible to use as an air mat. Consequently, it is necessary to provide partition sheets of forming or shaping band an inside of the flat bag and weld them to the outside and the rearside sheet materials at a suitable distance. And aie of a predetermined pressure is filled in the bag being expanded as a matless. Unfortunately, when pressed air is filled, first the air diffuses in an inner space of the bag and inner pressure of the bag fails to rise instantly resultanting in a continuation of zero-pressure condition for a while. After the whole capacity of inner space of the bag is filled with air, the inner pressure gradually rises. While a starting period of pressure rising, pressure rises at a very slowly rate and it is too little to know pressure rising by means of human sense and measuring installations.

Because the bag is made of soft vinyl sheets, even when much air is introduced into the bag, it is difficult to obtain a suitable and desirable pressure as the sleeper lays on him or her side. In general, it is comfortable to lay down and sleep on an air mat having a zero-pressure of inner space of the mat, however it is very difficult to generate such condition of zero-pressure in the mat. You often lay on an air met after it is something swelled. For example, the air mat of a size of a width:100 cm and a length:200 cm and having partition sheets of a height:15 cm is expanded with a pressure:5 m/m Hg and you laid down, thus an inner pressure of the air mat is raised to about 25 m/m Hg which is too high resulting in a hard bed mat and uncomfortableness of the sleeper.

If a zero-condition of inner pressure of an air mat is attained and you laid down on the mat, the pressure doesn't change, contrary to that of water beds changing their inner pressures correspondingly to the sinking depth of your body, so that you hip sink much more than that of the water bed and you can not hold a comfortable posture on the air mat bed. When an inner pressure of the whole bag during its usage is adjusted to about 20 m/m Hg in order to prevent your hip from over sinking, the air mat has a little comfortableness and some cushioning property. Unfortunately, these portions of human sides between the breastbone and the coxa having no bone except for the backbone, of peripheral lower portions of the shoulder blades, and of dent portion of rearside of the backbone are pushed up with pressure of 20 m/m Hg, which portions being free from any pressure while sleeping on the conventional bed, and you will feel violent pain in these portions in several minutes and you cannot endure such pain. As described above, it has been very difficult to employ the air mat as a comfortable air bed.

The conventional air mat provided with partition sheet materials is apt to be broken at end or edge portions of the partition sheets and the product of such air mat has poor endurance. In case the air mat is used to enjoy comfortable sleeping, the air mat is apt to be entered into a cloth bag made of thick cloth such as Gobelin tapestry and quilting cloth. Such conventional air mats have problems. When the rearside of the cloth bag is made of synthetic resin as well as made of cotton cloth, the surface side rubs against the rearside of the bag generating unpleasant sound while you climb-up and climb-down from the air mat bed and you roll on the bed.

The present invention is completed after considering such problems of the prior art and studying/experimenting the conventional products of the air mat.

SUMMARY OF THE INVENTION

Accordingly, it is one of the purposes of the present invention to provide an air mat adapted to be used as a bedsore-prevention bedding or a sound-sleeping bedding having a comfortable sleeping condition of water beds and enabling to prevent bedsores from generating by low support pressure for the sleeper thereon.

Another purpose of the present invention reside in an provision of an air mat of good at endurance because the welded circumferential portions of the frontside and the rearside sheet materials and respective partition sheet materials are strong and of non-broken condition.

Still another purpose of the present invention is to provide an air mat enabling to prevent unpleasant noise from generating during a usage of the mat, so that it is possible to take a sound sleep of the healthy person, of course, even sensitive persons.

Still another purpose of the present invention is to provide an air mat manufacturing method enabling to mass-produce the air mats provided with partition sheet materials at a low cost.

Consequently, the air mat of the present invention has characteristics of its structure comprising a plurality of independent air chambers respectively formed by welding the outside and rearside sheets of non-ventilation soft synthetic resin sheet material to a plurality of forming partition sheets, the independent air chambers are placed transversely to the body of person lain on the air mat and the air chambers are divided into several blocks or groups corresponding to portions of the body such as head and etc, air supply and exhaust taps respectively welded to the air mat in order to keep an expanded condition of all independent air chambers at the atmosphere, and automatic pressure control valves for keeping a predetermined support pressure of the inner pressure of all air chambers of respective blocks, which pressure is suitable to respective blocks for human parts.

Also, the air mat manufacturing method according to the present invention comprising the steps of placing, in order, the rearside sheet material, a plurality of partition sheet materials respectively double-folded and having a nonweldable thin plate member sandwiched therein, and an outside sheet materials having the air supply and exhaust tap and the like welded thereto on a tray having a number of slit portions of a double high frequency welding apparatus, and of welding the longitudinal upper edge portion of the partition sheet material, the outside sheet material, the longitudinal lower edge portion of the partition sheet material, and the rearside sheet material, through the slit portions by means of a upper electrode and a lower electrode of the double high frequency welding apparatus.

The purposes above and other objects and advantageous characteristics of the present invention will be apparent from the following description described with reference to the accompanying drawings.

BRIEF DESCRIPTION OF THE DRAWINGS

FIG. 32 is an outline plan view depicting the sixth step of the air mat manufacturing method according to the present invention.

DETAILED DESCRIPTION OF THE INVENTION

Figure 7:
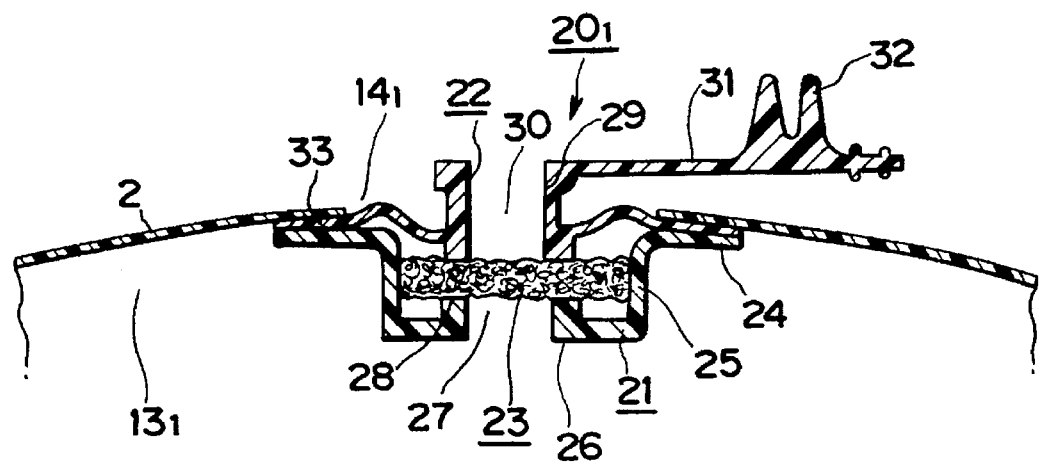
FIG. 7 is an enlarged sectional view of the air supply and exhaust tap shown by D-part of FIG. 3 and shows an open condition of the tap.

FIG. 1 through FIG. 7 depict a preferred embodiment of the air mat of the present invention. As described, the air mat has an air mat body and an air supply and exhaust tap. The air mat body 1 has a shape suitable to a person 100 laying thereon of in general a length: 2 m, a width: 1 m, and a thickness (expanded in usage): 15 cm. The air mat body 1 consists of two sheets and 3 of outside and rearside, respectively made of non-ventilation soft synthetic resin sheet material such as vinyl chloride synthetic resin sheet material enabling to be easily induced and generate heat with 27 to 40 Mz, and a plurality of partition sheet materials 4 of shaping band. The partition sheet material 4 has as described in FIG. 4 and FIG. 5 a length a little longer than the width of the outside and rearside sheet materials 2 and 3, and a length along short direction identical with one of 15 cm of the thickness of the air mat expanded plus a length of upper and lower edge portions 5 and 6 of welding margin. The partition sheet material 4 has a shape of band. One bending line 7 is formed by high frequency machining process so as to extend along the whole length of the band on its center line. The plurality of partition sheet materials 4 are bent or folded through the central bending line 7. Both end portions 8 of the partition sheet material 4 are sandwiched between both long-directional end edge portions 9, 10 of the outside and the rearside sheet materials 2, 3. Whole circumferential edge portion including both short-directional end edge portions 11, 12 of the outside and the rearside sheet materials 2, 3, and the upper and the lower edge portions 5, 6 along a long direction of respective partition sheet material 4 are welded to each ether so a to provide a plurality of (20 in the embodiment) independent air chambers $13_1$ to $13_{20}$, respectively extend transversely to the laying person 100. It is noted that, in the embodiment of the present invention, one bending line 7 is employed for the partition sheet material 4 and it is possible to employ two bending lines 7 on the outside and the rearside at shifted or differred positions. The air supply and exhaust taps $20_1$ to $20_{20}$, respectively welded to open portions 14, (FIG. 7 shows only one portion 14) at the positions corresponding to respective air chambers $13_1$ to $13_{20}$. These air supply and exhaust taps have function of keeping the atmosphere-expanded conditions of respective air chambers $13_1$ to $13_{20}$ to which air is supplied through an air supply means such as manual or motive air pump and the like (not shown). The air supply and exhaust taps $20_1$ to $20_{20}$ are represented by one with a reference numeral $20_1$. These taps are wholly made of soft vinyl chloride, and consist of inner side and outer side tap bodies 21, 22 of about cylindrical shape and a resistor 23 sandwiched between these inner and outer tap bodies 21, 22. The inner tap body 21 has a circular brim 24, a pendent circular wall 25 integrally formed at a lower portion of the circular brim 24, a bottom wall portion 26 provided with a central opening 27 integrally formed at an inner lower end of the circular wall 25, and erected or vertical portion 28 formed at circumferential edge of the opening. The outer tap portion or body 22 provides with a cylindrical portion 29 having an opening portion 30 adapted to the opening portion 27, a tap body portion 32 integrally formed on an top edge of the cylindrical portion 29 through a bendable band portion 31, and a circular brim edge 33 integrally formed on lower circumference of the cylindrical portion 29. The resistor 23 has a function keeping an expanded condition of an air chamber 13, (like air chambers $13_2$ to $13_{20}$) at the atmosphere, and made of non-woven cloth having ventilation such as felt. As described above, the resistor 23 is sandwiched between an top surface of the vertical portion 28 of the inner tap portion 21 and a bottom surface of the cylindrical portion 29 of the outer tap portion 22. These brim edges 24, 33 of the inner and outer tap portions are integrally welded to circumferential edge of the opening portion 14.

Usage of the air mat constructed as described above will be explained. Air supply means (not shown) such as mamal or motor pump supplies air to respective air chambers $13_1$ to $13_{20}$ through respective air supply and exhaust taps $20_1$ to $20_{20}$ in order to once swell sufficiently the outside sheet material 2, and the swelled sheet material 2 is kept as it is for several minutes. Because the air supply and exhaust taps $20_1$ to $20_{20}$ are pre-pressed by air before air supplying of the air supply means, air, flows through the taps without substantial resistance.

When air flowing is stopped and the air chambers are left as they are and pressure in the air chambers $13_1$ to $13_{20}$ is high, air volume flowing through the resistor 23 if the air supply and exhaust taps $20_1$ to $20_{20}$ is high or much resulting in decrease, of the inner pressure. When inner pressure reaches zero resulting in a pressure balanced condition between inner environment and outer environment of the air mat body 1. After that, air volume flowing through the resistor 23 becomes very small determined by only a pressure of weight of the outside sheet material 2 becoming the shrinking speed of the air mat body 1 very slow. Then, the tap body portions 32 of respective air supply and exhaust taps $20_1$ to $20_{20}$ is closed, so that expanded condition of respective air chambers $13_1$ to $13_{20}$ are kept at the atmosphere. When a person 100 of, for example, a height: about 170 cm, weight: about 70 kg is laid on the air mat body 1, a maximum inner pressure of an air chamber of the head block a was measured to 8 m/m Hg, of an air chamber of the breast and belly block b was 14 m/m Hg, of an air chamber of hip block c was 18 m/m Hg, of air chamber of the thigh or femoral region block a was 6 m/m Hg, and of the leg (heel) block e was 4 m/m Hg, Other embodiment of the air mat related to the present invention is shown in FIG. 8.

According to the embodiment of the air mat, a plurality of air chambers of the air mat body are independently divided into a plurality of blocks corresponding to parts of the human body such as head, In FIG 1 to FIG. 7, the same or corresponding portions and members have the same reference numerals. That is the air mat body 1 is made of outside and rearside sheet materials 2 and 3 and a plurality of partition sheet materials 4 respectively providing with one ventilation hole 15 formed at an end portion of longitudinal direction of the air mat 1. They are melded with the method similar to that of the embodiment shown in FIG. 1. In detail, the air mat body 1 is independently divided into a head block a, a breast and belly block b, a hip block c, a thigh block a, and a beg (heel) block e by means of partition sheet materials having no ventilation hole. Respective blocks have a plurality of air chambers which are alternately placed at one end portion and other end portions along longitudinal direction of outside and rearside sheet materials 2 and 3 and welded to them and mutually connected by means of the plurality of partition sheet materials 4. Similar to that of the embodiment of the air mat shown in FIG. 1, respective air supply and exhaust taps $20_4$, $20_8$, $20_{12}$, $20_{16}$ and $20_{20}$ are welded to the last air chambers $13_4$, $13_8$, $13_{12}$, $13_{16}$, $13_{20}$ of respective blocks a to e. A usage method of the air mat of the embodiment is liked to that of the previous embodiment and has the same result. According to the embodiment, it is enough to supply air to the air supply and exhaust taps in respective blocks and it is possible to prevent air from troublesome supplying to all air supply and exhaust taps as that of the previous embodiment of the air mat.

Figure 13:
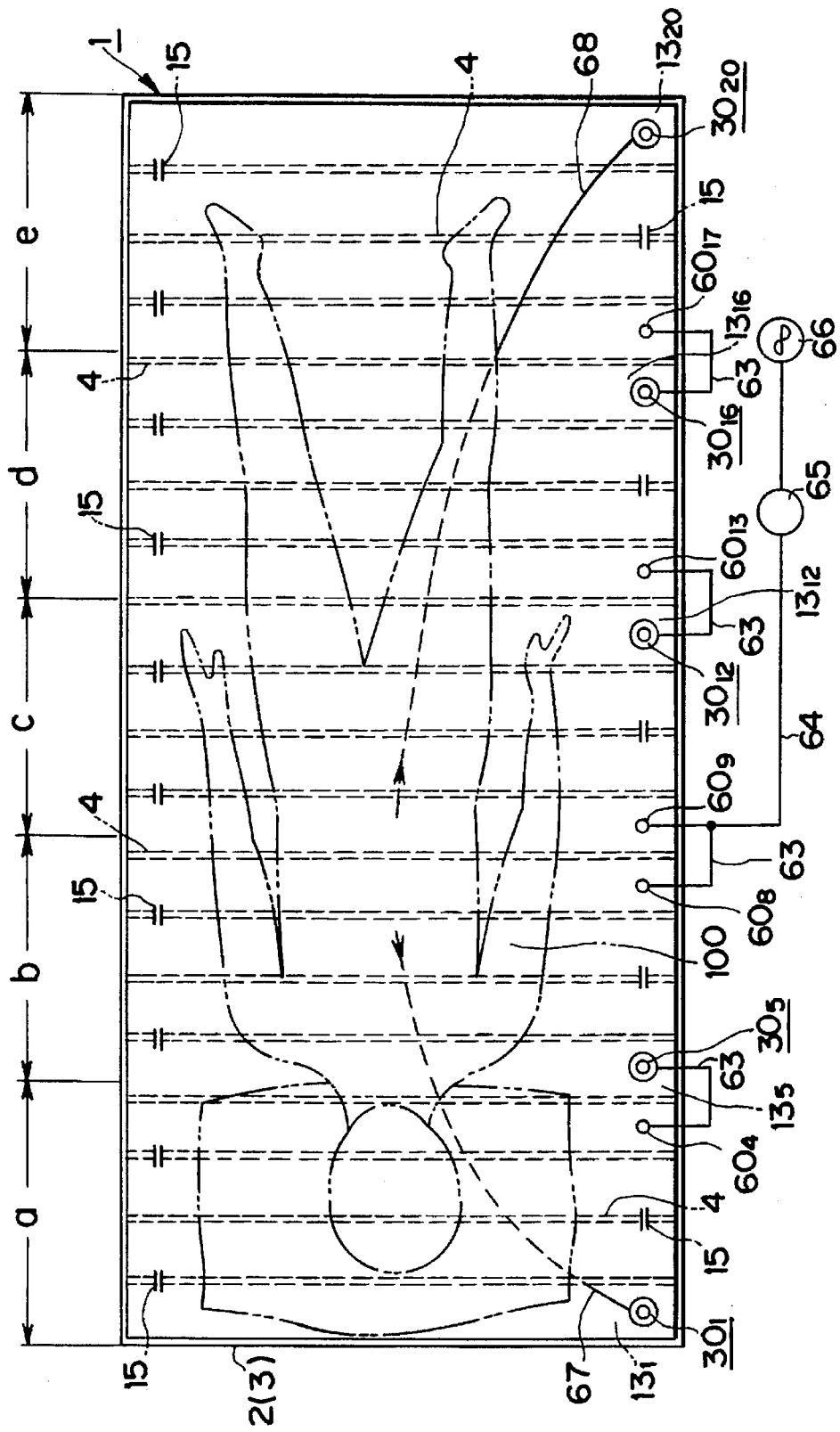
FIG. 13 is an outline plan view showing other embodiment of the air mat according to the present invention.

Still another embodiment of the air mat according to the present invention is shown in FIG. 13.

Figure 8:
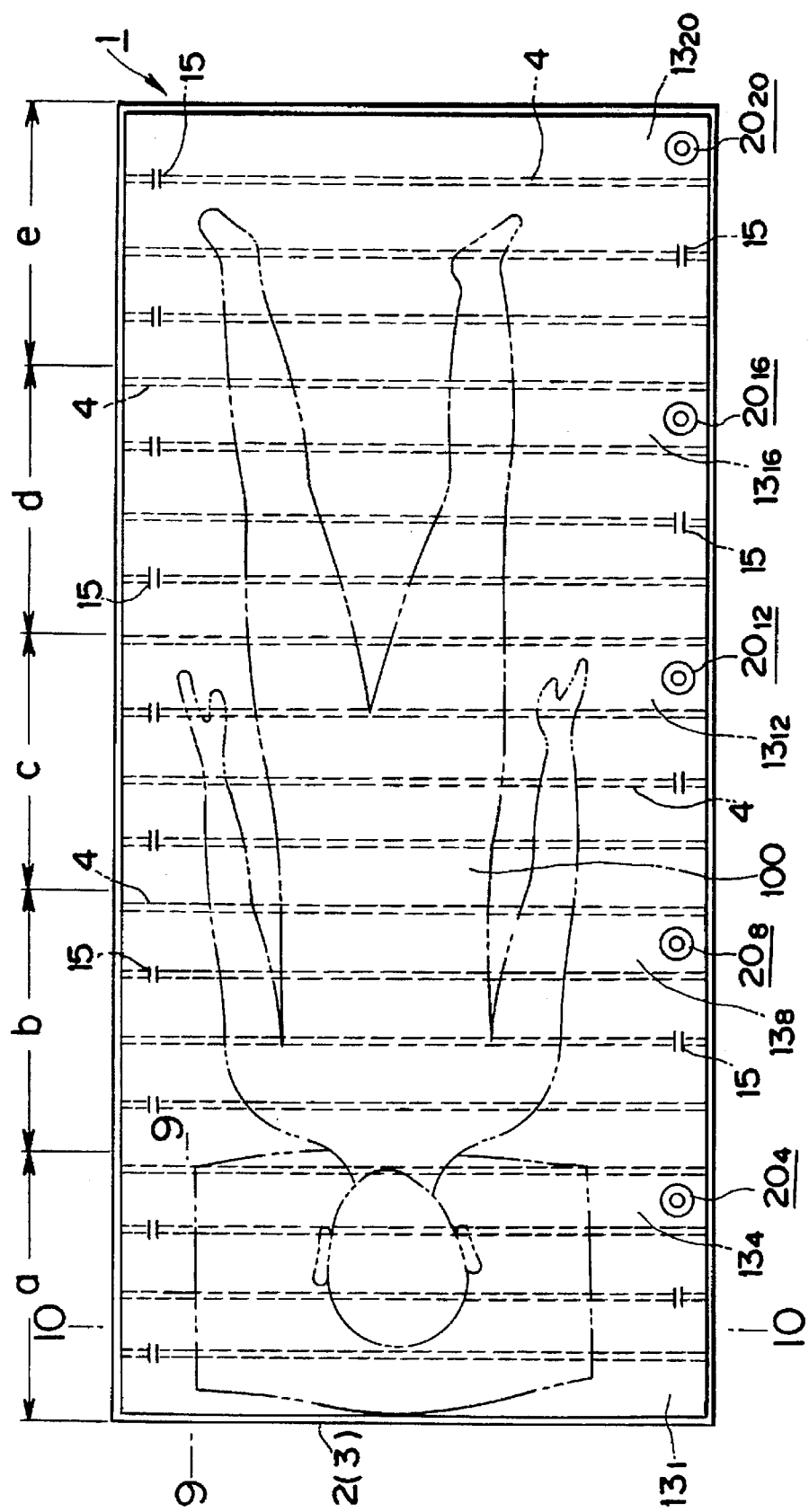
FIG. 8 is an outline plan view showing another embodiment of the air mat according to the present invention.
Figure 9:
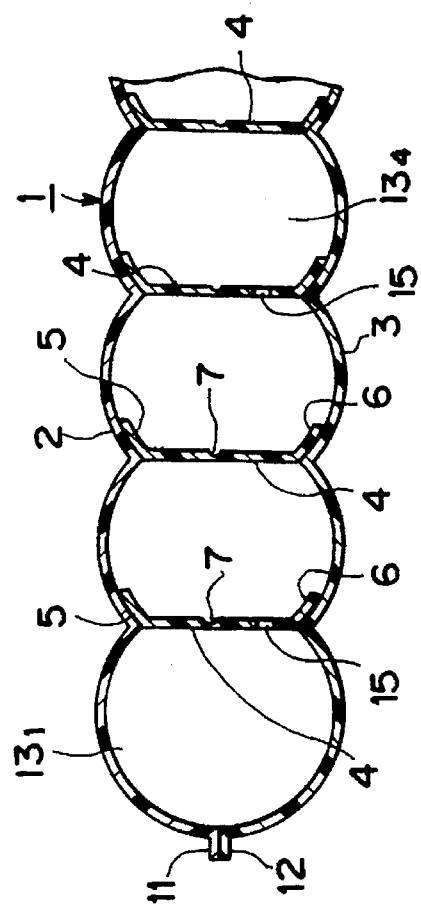
FIG. 9 is an enlarged sectional view of the expanded air mat taken along line 9—9 of FIG. 8.
Figure 14:
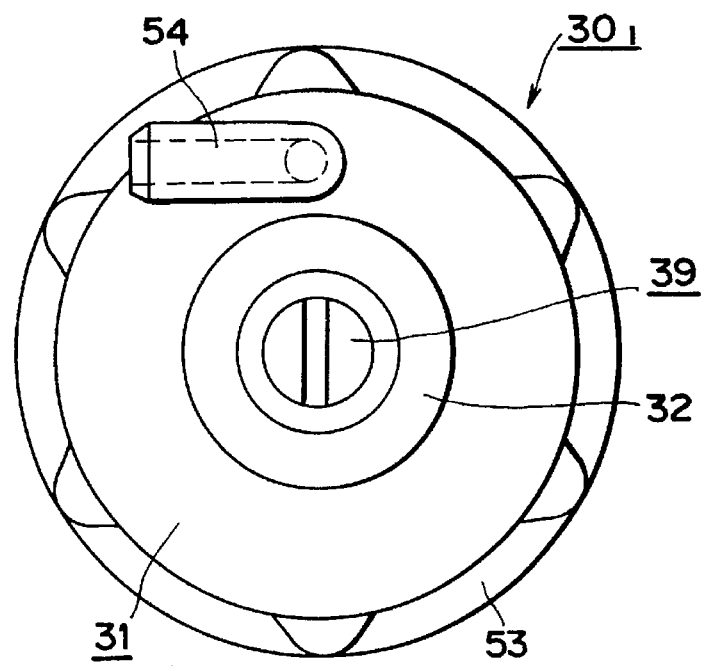
FIG. 14 is a plan view of an automatic pressure control value.
Figure 15:
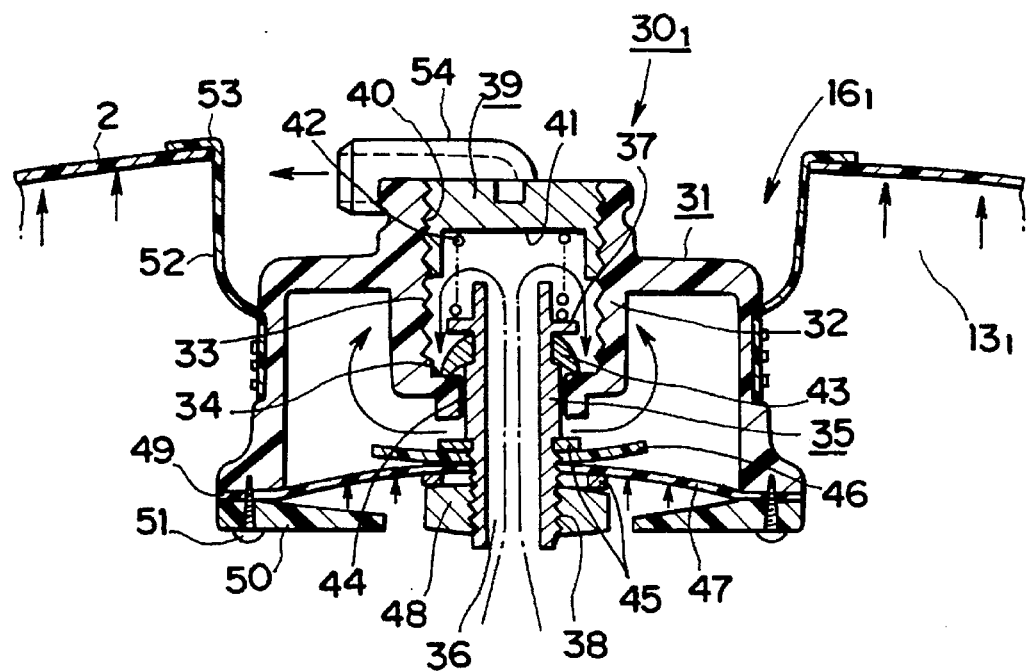
FIG. 15 is a longitudinal sectional view of the automatic pressure control value welded to an outside sheet material.
Figure 16:
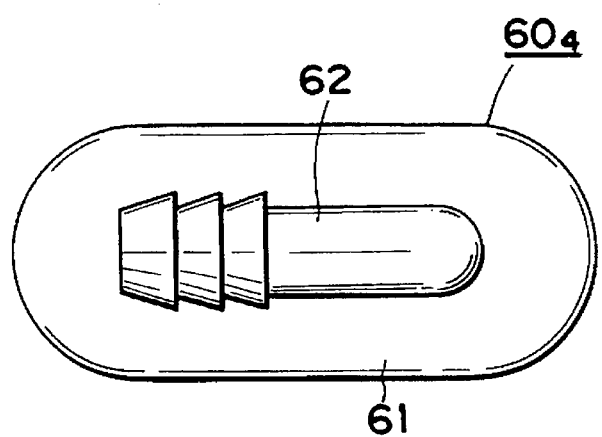
FIG. 16 is a plan view of a ventilation connecting member.
Figure 17:
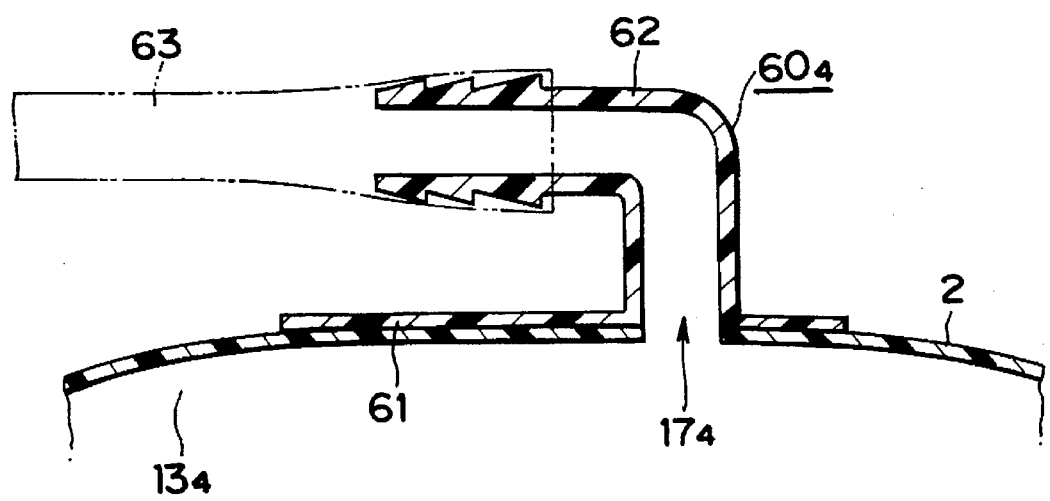
FIG. 17 is a longitudinal section of the ventilation connecting member welded on the outside sheet material.

According to the embodiment, the air mat body 1 similar to that shown in FIG. 8 has pluralities of automatic pressure control values ad ventilation connection members, respectively welded to the air mat boy 1. The members and parts of the air mat body corresponding to these shown in FIG. 1 to FIG. 8 have the identical reference numerals. The air mat body 1 is identical with that shown in FIG. 8, so that their explanation will be omitted and only automatic pressure control valves and ventilation connection members will be explained. The automatic pressure control valve $30_1$ shown in FIG. 14 and FIG. 15 is a representative of these $30_1$, $30_5$, $30_{12}$, $30_{16}$, $30_{20}$. These automatic pressure control valves are integrally made of hard synthetic resin. A valve frame 31 has a cylindrical portion 32 provided With a thread hole 33 formed on its inner circumferential face and a valve seat 34 of a L sectional shape formed on a lower circumferential face of the cylindrical portion 32. Through the cylindrical portion 32, a tubular rod 35 and a spring-control screw are inserted. The tubular rod 35 has a central through hole 36 extending along longitudinal direction of the rod and a spring receiving brim 37 formed on an upper outer circumference and a male thread portion 38 formed on a lower outer circumference. The spring-control screw 39 has a male thread portion 40 engaged with the thread hole 33 and a spring receiving concave portion 41 formed at its bottom end. The spring-control screw 39 is fastened by threading of the male thread portion 40 into the thread hole 33. A coil spring 42 is placed between the spring receiving concave 41 of the spring-control screw 39 and the spring receiving brim 37 of the tubular rod 35. A lower outer circumference of the spring receiving brim 37 has a valve 43 of a sectional shape of narrow top and broad bottom adapted to engage with the valve seat 34 of a L-shape section of the cylindrical portion 32. The tubular rod 35 can slide up-and-down direction through a gap 44 formed between the rod 35 and a lower end opening portion of the cylindrical portion 32. The tubular rod 35 has a male thread portion 38 on which a holding or pressing plate 45, a stable plate 46 and a rubber membrane 47 are inserted through their center portions, and they are fixed by a nut 48. An outer circumferential portion 49 of the rubber membrane 47 is fastened to lower end opening portion periphery of the valve frame 31 through a pressing member 50 by means of a screw 51. A fixing body 52 provided with a circular brim edge 53 made of the same material as that of the outside sheet material 2 of the air mat body 1 is pastened to outer periphery of the valve frame 31. A top portion of the valve frame 31 has a L-shape pipe connecting portion 54. The automatic pressure control valve $30_1$ is near the longitudinal edge portion 9 of the outside sheet material 2 and integrally welded to the portion 9, by welding the brim portion 53 of the fixing body 52 to circumferential edge of opening portion 16, (other opening portions are not shown) of human parts corresponding to air chambers $13_1$, $13_5$, $13_{12}$, $13_{16}$ and $13_{20}$. Ventilation connecting members $60_4$ and automatic pressure control valve $30_5$, ventilation connecting members $60_8$, $60_9$, automatic pressure control valve $30_{12}$ and ventilation connecting member $60_{13}$, automatic pressure control valve $30_{16}$ and ventilation connecting member $60_{17}$ are respectively connected through connecting pipe 63. An air pump 65 of air supply mean is connected to the connecting pipe 63 for ventilation connecting members $60_8$, $60_9$. A power source 66 is connected to the air pump 65. With automatic pressure control valve $30_1$ of head block a and automatic pressure control valve $30_{20}$ of leg (heel) portion block e, a small-dia exhaust pipe 67 extended to the breast and belly portion block b and a small-dia exhaust pipe 68 extended to the hip block c are connected to automatic pressure control valves $30_1$ and $30_{12}$ respectively in order to leak moisture and prevent the air mat from sweating.

The air mat of the embodiment structured as mentioned above is used as described below.

Figure 1:
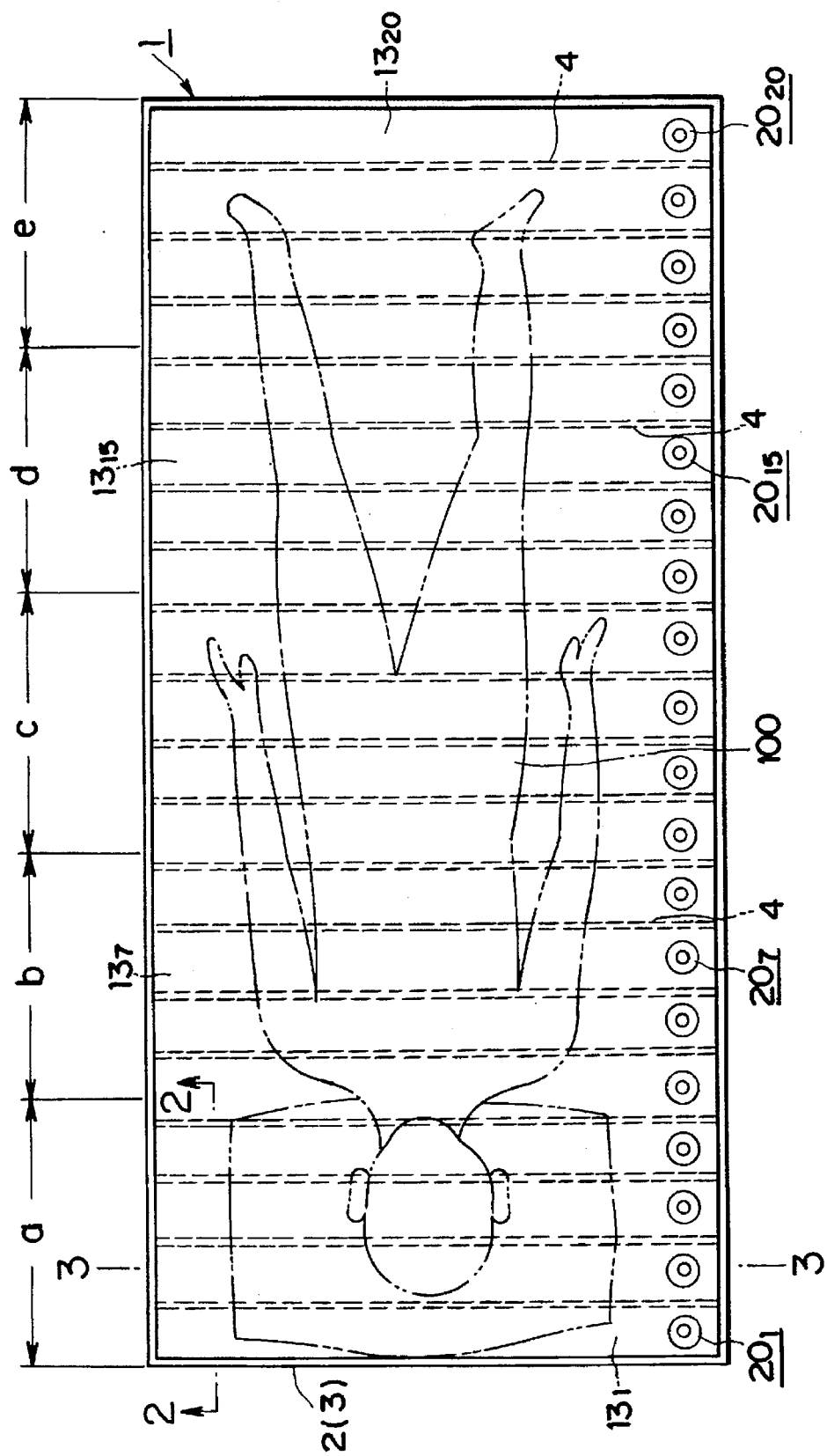
FIG. 1 is an outline plan view showing one example of the air mat according to the present invention.
Figure 2:
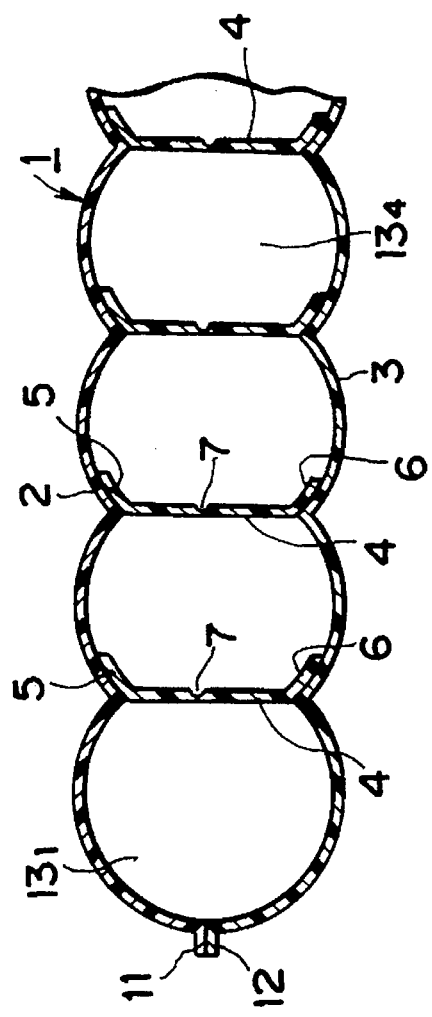
FIG. 2 is an enlarged sectional view of the expanded air mat taken along line 2—2 of FIG. 1.

As described in FIG. 13, these automatic pressure control valves $30_1$, $30_5$, $30_{12}$, $30_{16}$, $30_{20}$ of respective blocks a to e are previously controlled so as to operate at a pressure identical with that of the first and the second embodiments shown in FIG. 1, FIG. 8, such as head is 8 m/m Hg, breast and belly 14 m/m Hg, hip 18 m/m Hg, thigh 6 m/m Hg and leg (heel) 4 m/m Hg. Before laying of human body on the air mat, the pump 65 operates and he or she lays on the mat after it swells well. Once air chambers of each block rise at their inner pressure, then in 2 or 3 minutes surplus air exits from each automatic pressure control valve through small-dia air exhaust pipes 67, 68 attaining a previously fexed pressure. The air pump 65 is kept at its operating condition. A sleeping or laying posture of the person is natural and he or she sleeps very well without sinking and pushing-up of especially hip. When the same person sleeps or lays on mats of different thickness, different inner pressures are generated. When the mat has a thickness: 15 cm, a pressure applied to hip of the human body is at most 14 m/m Hg. When it has a thickness: 10 cm, almost all portions of person have pressure of about a third fourth of the previous case. It is lower than that of the water bed resulting in 3 m/m Hg at the heel which is apt to be suffered from bedsore. As described above, the supporting pressure for the layer on the air mat is very low preventing the patient thereon from suffering bedsore.

Because the air mat according to the embodiment has automatic pressure control values, when pressure in the air chambers $13_1$ to $13_{20}$ of respective blocks a to e rises as shown in FIG. 15, pressure is applied to the rubber membrane 47 as well as outside sheet material 2 raising gradually the spring 42 and leaving a gap between the valve 43 and valve seat 34. Accordingly, pre-pressed air in the air chamber 13, (including the air chambers $13a$ to $13_{20}$, this is to be repeated in the following.) exits along the course as shown in the arrow from a through hole of the tubular rod 35→thread hole 33 of the cylindrical portion 32→gap between the valve 43 and valve seat 34→gap 44 between cylindrical portion 32 and tubular rod 35→gap of the valve frame 31→piping connecting portion 54→small dia exhaust pipe 67. Similarly, air exits through also small dia exhaust pipe 67. When small volume of air exists, pressure in the air chamber 13, lowers closing the gap between the valve 43 ad valve seat 34 and stopping existing of pre-pressed air. Consequently, pressure in the air chamber 13, rises repeatedly. Repeating such fine operation keeps the pressure in the air chamber 13, at a suitable supporting pressure previously set correspondingly to respective blocks a to e of the human body 100. In order to control and set pressure in the air chamber 13, the spring control screw 39 is adjusted so as to control a force of the spring 42 to be applied to the valve 43.

As described above, because an inner pressure of the air chamber 13, is controlled by only the force of spring 42, a desired pressure will automatically be attained if even air is forcibly entered to the air mat while no person is lain whereon. When a person is lays on the air mat, pressure of the breast and belly portion block b and hip block c rises by about 10 m/m Hg, the pressure returns to a controlled one in about two minutes. Such controlled pressure is kept after that. When he or she steps down from the air mat, pressure lowers by about 5 m/m Hg and it returns to the original controlled pressure in about two minutes according to the discharging volume of the air pump 65. Concerning the ventilation holes is formed in the partition sheet material 4, when a person sis down on the air mat or steps in the mat, the outside sheet material 2 touches with the rearside sheet material 3. It is a phenomenon of step break of feet which has been happened in the conventional air mat and such phenomenon doesn't happen in the air mat according to the present invention. It is not necessary to re-adjust the pressure in the air mat when it is used by an adult or a child.

As shown in FIG. 13, the air exhaust pipes 68 extend from leg (heel) portion bock e to hip bock d. The air exhaust pipes 67, 68 placed under sheets or futon on the mat are made of large-thickness small-diameter pipe, so that they are not afraid of crushing due to weight of the sleeper thereon. It is not necessary to close end portions of the pipes and pierce small bores through the closed end portions, and it is enough to cut the end portions and lease as they are. Air exhausted from the pipes flows through cotton fabrics of the futon and spreads over whole air mat, so you don't feel cold even a room temperature is about 15° C. and the air mat is prevented from becoming. When room temperature is lower than about 15° C., it is not necessary to worry about dampness and these air exhaust pipes 67, 68 are left disengaged.

Figure 18:
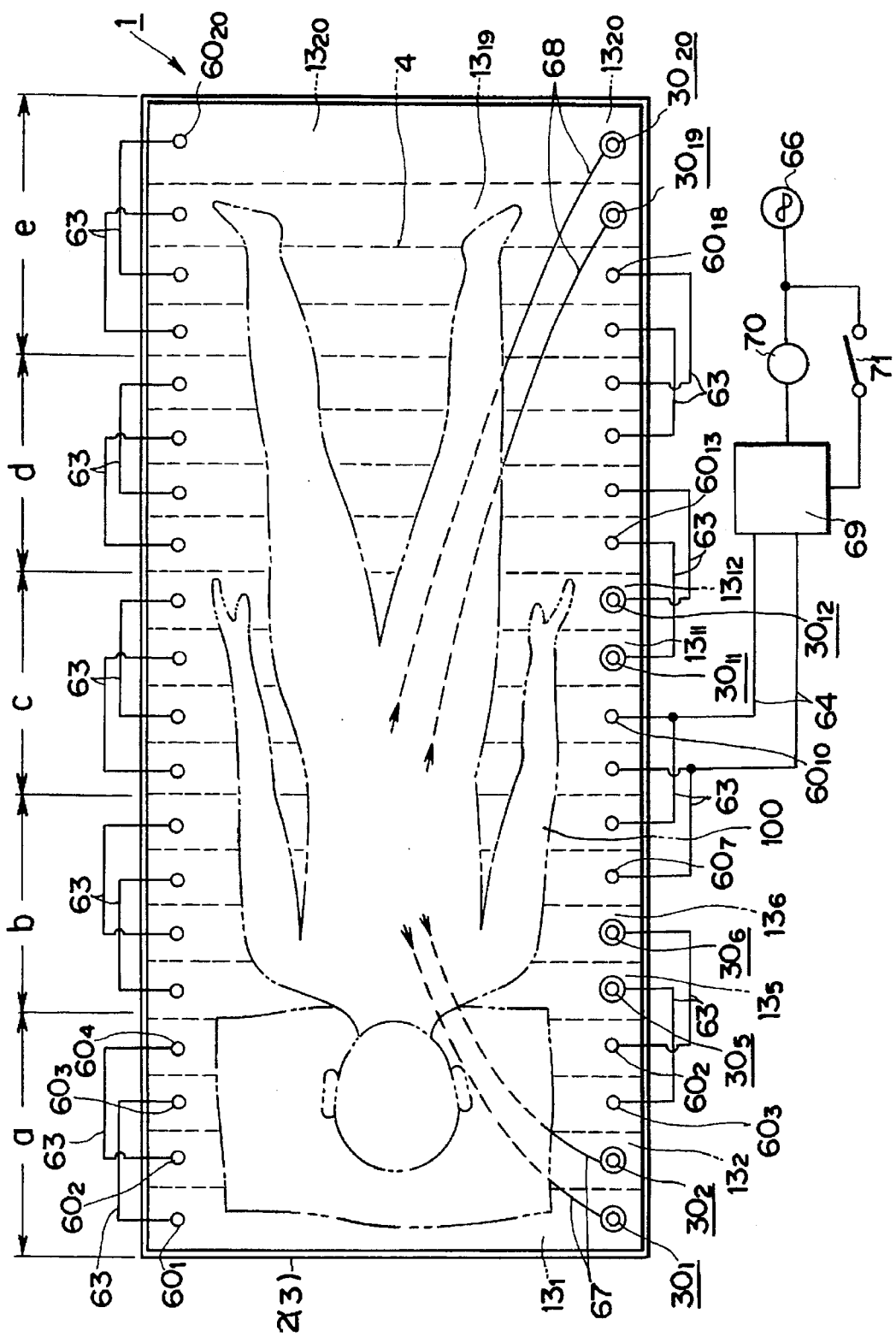
FIG. 18 is an outline plan view depicting stall other embodiment of the air mat according to the present invention.

Still another embodiment of the air mat according to the present invention is shown in FIG. 18.

According to the embodiment, the air mat is ordinarily used as a plain or flat one similar to that shown in FIG. 13 and the air mat can be changed easily in necessary to waving type mats for patients. In detail, as shown in FIG. 18 having the reference numerals identical with that depicting the corresponding members and parts shown in FIG. 13, the air chambers $13_1$ to $13_{20}$ of the air mat body 1 are divide into two systems every other one and one system is divided into head block a, breast and belly block b, hip block c, thigh block d, leg (heel) block e. Further more concretely, ventilation connection members $60_1$ to $60_{20}$ are welded to the portions corresponding to respective air chambers of longitudinal side edge portions o the outside sheet material 2 of the air mat body 1, the ventilation connection members of odd numbers (for example, ventilation connection members $60_1$ and $60_3$) and other ventilation connection members of even numbers (for example, ventilation connection members $60_2$ and $60_4$) are connected to each other through respective connection pipes 63, as well as longitudinal other side edge portions of the outside sheet material 2 of the air mat body 1, which edge portions corresponding to the air chambers $13_1$, $13_2$, $13_5$, $13_6$, $13_{11}$, $13_{12}$, $13_{19}$, $13_{20}$ are welded to automatic pressure control valves $30_1$, $30_2$, $30_5$, $30_6$, $30_{11}$, $30_{12}$, $30_{19}$, $30_{20}$. The edge portions corresponding to the to the remaining air chambers are welded to ventilation connection members $60_3$, $60_4$, $60_7$ to $60_{10}$, $60_{19}$ to $60_{18}$. The ventilation connection members of odd numbers and of even numbers, except for respectively two automatic pressure control valves $30_1$, $30_2$, $30_{19}$, $30_{20}$ of head block a and leg (heel) block e, are connected to each other through connection pipes 63 in order to divide all air chambers into alternately two systems every other one. The connection pipes 63 of two ventilation connection members of the breast and belly block b and hip block c are welded to respective air flow pipe 64, as well as the air flow pipe 64 is connected to air pump (diaphragm pump) 70 o air supply means by a control apparatus 69 including a magnetic valve (not shown). Further, there is a switch 71 between the control apparatus 69 and the power source 66. Two automatic pressure control valves $30_1$ and $30_2$ of the head block a and other two automatic pressure control valves $30_{19}$ and $30_{20}$ of the leg (heel) block e are connected to small-diameter exhaust pipes 67 and 68.

How to use the air mat according to the embodiment will be explained. The air pump 70 is always supplying air to respective air chambers of the air mat body 1 and a switch 71 of the control apparatus 69 is kept at OFF condition. Ordinarily the air mat is under the condition above and used as a plain one. When blood pressure of the patient drops to about 80 m/m Hg at its highest side, blood pressure in the capillary lowers less than 20 m/m Hg and the air mat at its plain condition is not able to be applied to the patient. Consequently, the switch 71 is turned ON and air in the air chambers of two systems is discharged by means of magnetic valves (not shown) of the control apparatus 69 circulating blood flow intermittently and preventing the patient from suffering bedsore. At this time, pressure level of two automatic pressure control valves $30_5$, $30_6$ of the breast and belly block b and two automatic pressure control valves $30_{11}$, $30_{12}$ of the hip block c is again adjusted to about 20 m/m Hg. On the contrary, these two automatic pressure control valves $30_1$, $30_2$ and $30_{19}$, $30_{20}$, respectively of the head block a and the leg (heel) block e are kept they are. Respective two automatic pressure control valves of breast and belly block b and hip block c functions as a check valve, so that no waving occurs in the air chambers of head block and leg block obtaining smooth condition of the air mat at a pressure level set.

Still other embodiment of the air mat according to the present invention is shown in FIG. 19 to FIG. 22.

According to the embodiment, the outside and the rearside sheet materials of the air mat body are made of fabric made by planting hairly material on the sheet material and of fabric bag containing the air mat body and members welded the body. Further, the air mat body 80 has a longitudinal-extended square in plan view similar to that of the air mat body 1 and made of two outside and rearside sheet materials 81, 82 and a plurality of partition sheet material 4 (including partition sheet material provided with ventilation holes 15). An air pump (not shown) supplies air to the air mat body 80.

Figure 19:
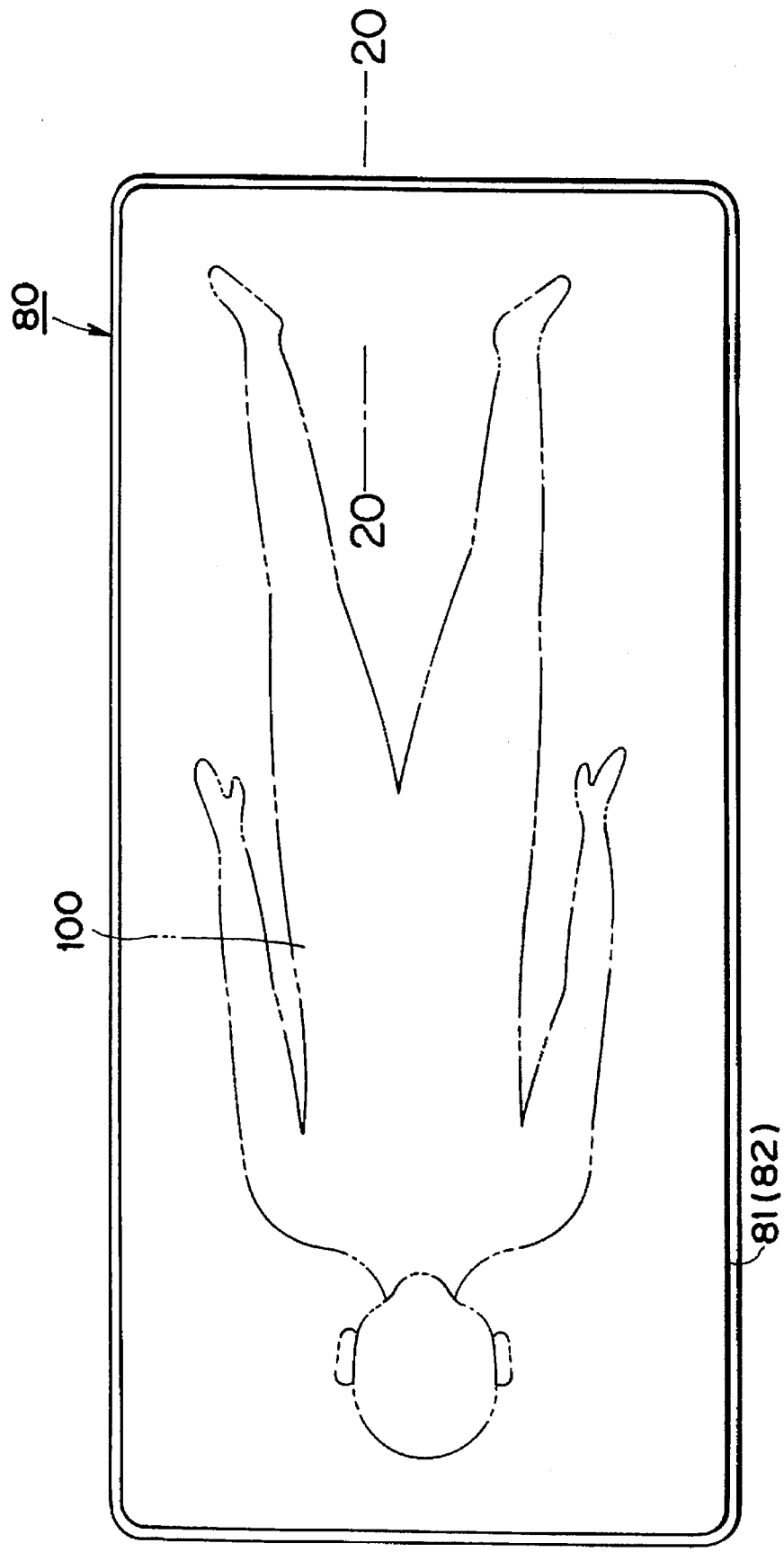
FIG. 19 is an outline plan view of the air mat of the present invention, which air mat having an air mat body contained in a cloth bag.
Figure 20:
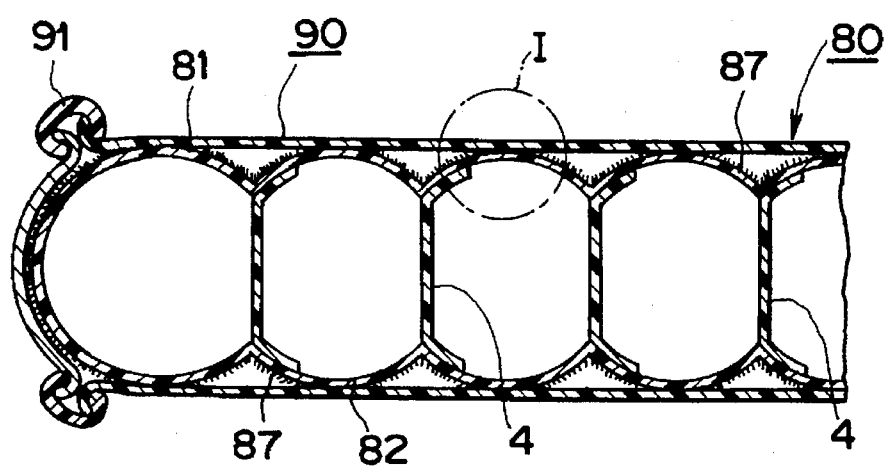
FIG. 20 is an enlarged sectional view of the expanded air mattaken along line 20—20 of FIG. 19.

It is noted that air supply and exhaust tap, ventilation connection member, and automatic pressure control valves are omitted from FIG. 19, and the air mat body 80 of the embodiment includes the structure of the air mat body 1 shown in FIG. 1, FIG. 8, FIG. 13 and FIG. 18.

Figure 22:
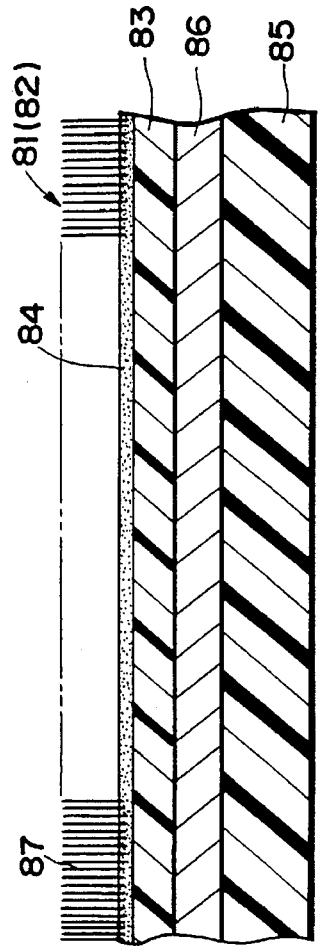
FIG. 22 is a section depicting an embodiment of a manufacturing method for outside and rearside sheet materials of the air mat.

How to make the outside and the rearside sheet fabrics 81, 82 is shown in FIG. 22. As shown, these fabrics 81,82 are made by coating a bond or adhesive agent layer 84 uniformly on a plain vinyl chloride sheet material 83. The adhesive agent and vinyl chloride are compatible with each other in material. The sheet material 83 is placed on a band-like electrode 86 on an insulation plate 85. Single fibers of did: 20μ and length: 0.5 to 1.0 m/m are scattered on the adhesive agent layer 84 and they are vertically planted providing single fibers plantation 87. Next, these sheet materials 81, 82 are dried and excess single fibers are removed and the air mat body 80 has its predetermined thickness kept by respective partition sheet material 4 (FIG. 20) when the outside and the rearside sheet fabrics 81, 82 of fiber-planted vinyl chloride sheet material are given with pressure air. The air mat body 80 is contained in a fabric bag body 90 having beads 91.

Figure 21:
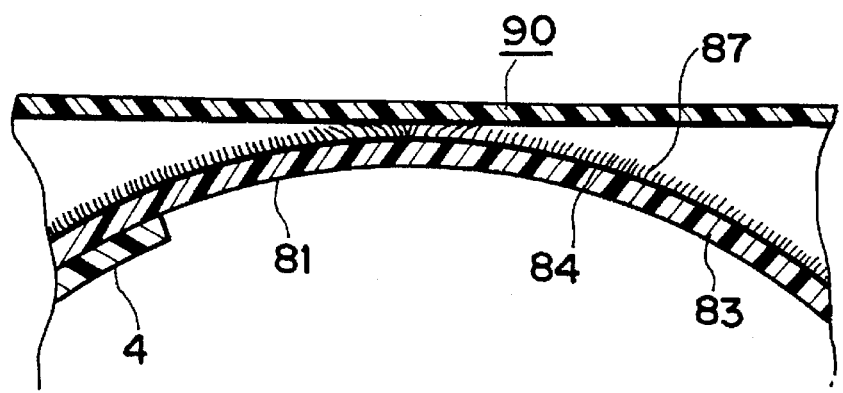
FIG. 21 is an enlarged view of I part of FIG. 20.

According to the embodiment of the present invention shown in FIG. 21, when the bag body 90 comes into contact with vinyl chloride sheet material 83, erected fibers of single-fiber plantation 87 fall. As a result, when a person steps on or down from the air mat and turns over thereon resulting in horizontal-moving of the bag body 90 along right-and-left direction, fallen single-fiber plantation 87 functions as a slider and the outside and the rearside sheet materials 81, 82 don't vibrate failing to generate unpleasant friction noise. As a result it is possible to take sound sleeping for not only healthy persons but also sensitive patients without being disturbed by such friction noise.

Next, the manufacturing method for the air mat according to the present invention will be explained.

In general, the manufacturing method consists of six steps.

The general, the manufacturing method consists of six steps.

The first step of forming a bending or folding line 7 along whole length of the plural partition sheet materials 4 at its longitudinal center line, which sheet materials have predetermined length and width and function as shape-holding bands and made of non-ventilation soft synthetic resin sheet material, by means of high frequency welder or impulse heater and the like, and piercing ventilation holes 15 at one longitudinal end portion of the sheet material. The forming process and the piercing process are carried out continuously or simultaneously.

Figure 23:
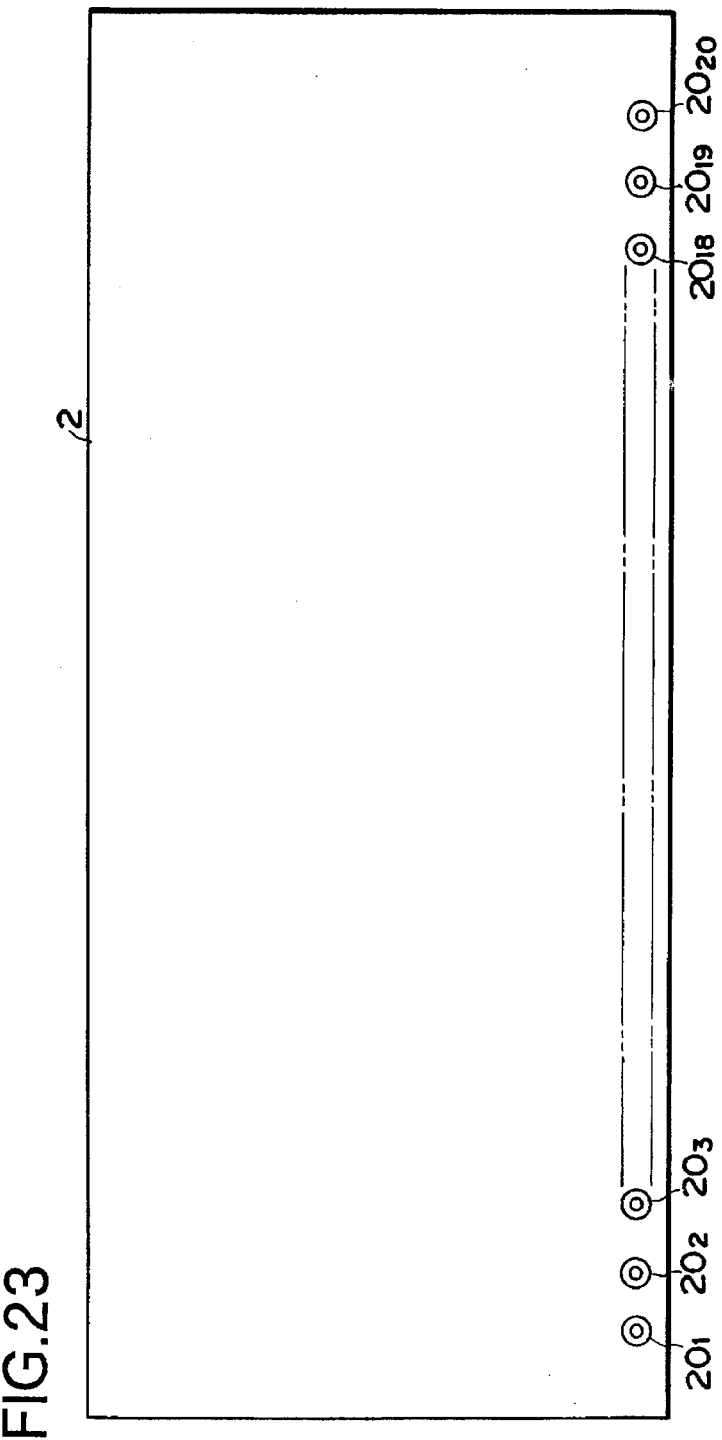
FIG. 23 is an explanation view of the second step of the manufacturing method according to the present invention.

The second step of the manufacturing method for air mats is shown in FIG. 23 of a diagrammatical drawing failing to show a mid portion of arrangement of air supply and exhaust taps, automatic pressure control valves and ventilation connection members. In the second step, either groups of these taps, valves and members above are welded in opening portions formed at the predetermined places of the outside sheet material 2 of non-ventilation soft synthetic resin sheet material having a predetermined length and width. The air mat 2 shown in FIG. 23 is used to the air mat body 1 shown in FIG. 1. The air mat 2 shown in FIG. 23 depicts only six air supply and exhaust taps $20_1$ to $20_3$ and $20_{18}$ to $20_{20}$ and other taps are shown by two-dot lines. FIG. 53 shows a typical form of the second step. When the air mat shown in FIG. 13 is used, automatic pressure control valves and ventilation connection members are welded at the predetermined positions of the longitudinal end edge of the outside sheet material 2. In case that air mat shown in FIG. 18, is used, automatic pressure control valves and ventilation connection members are welded at the predetermined positions of a longitudinal end edge portion of the outside sheet material 2, as well as other predetermined positions of other longitudinal end edge portion have ventilation connection members welded to the other predetermined positions.

Figure 24:
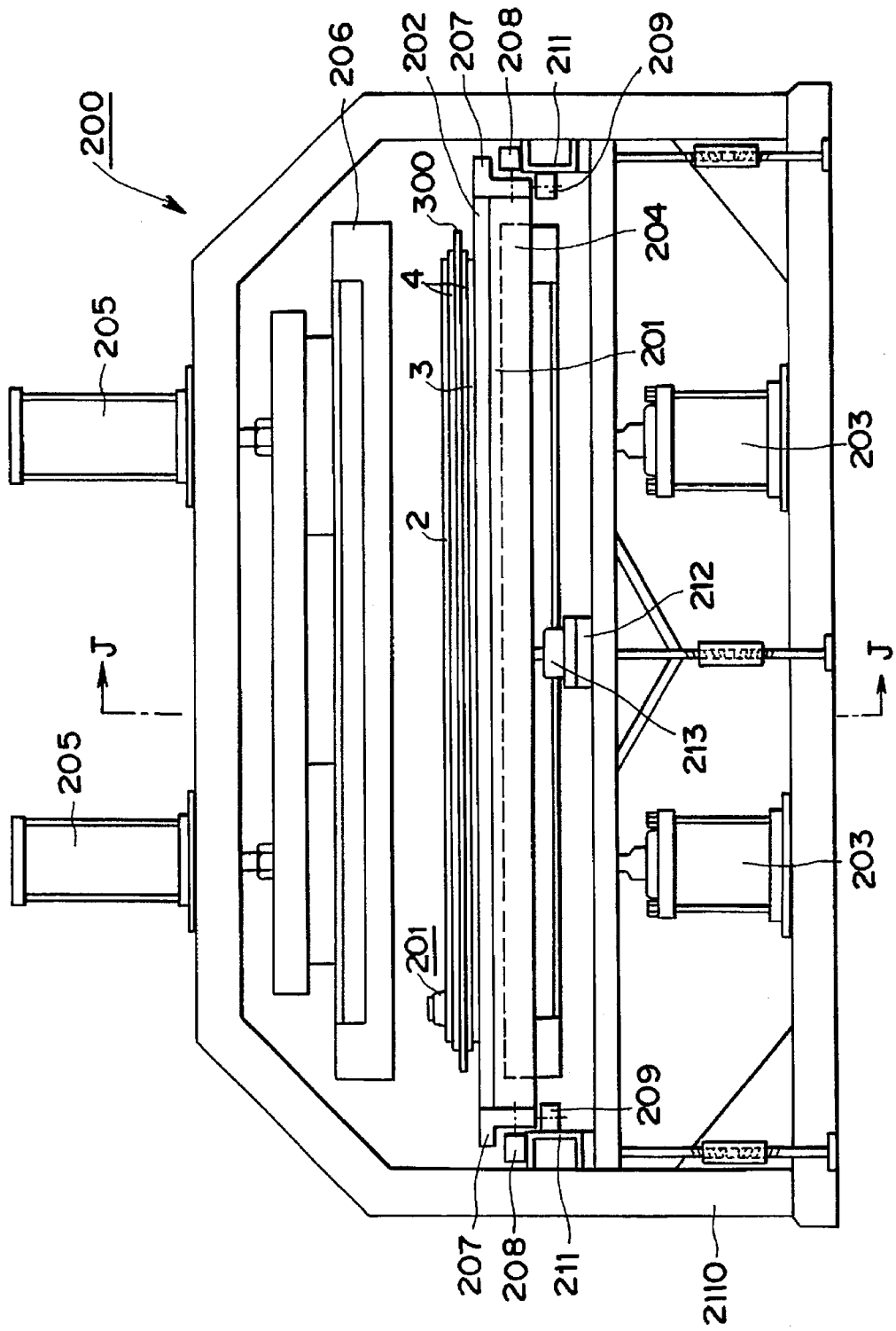
FIG. 24 is a side view depicting an embodiment of the double high frequency welding apparatus adapted to use in the manufacturing method according to the present invention.
Figure 25:
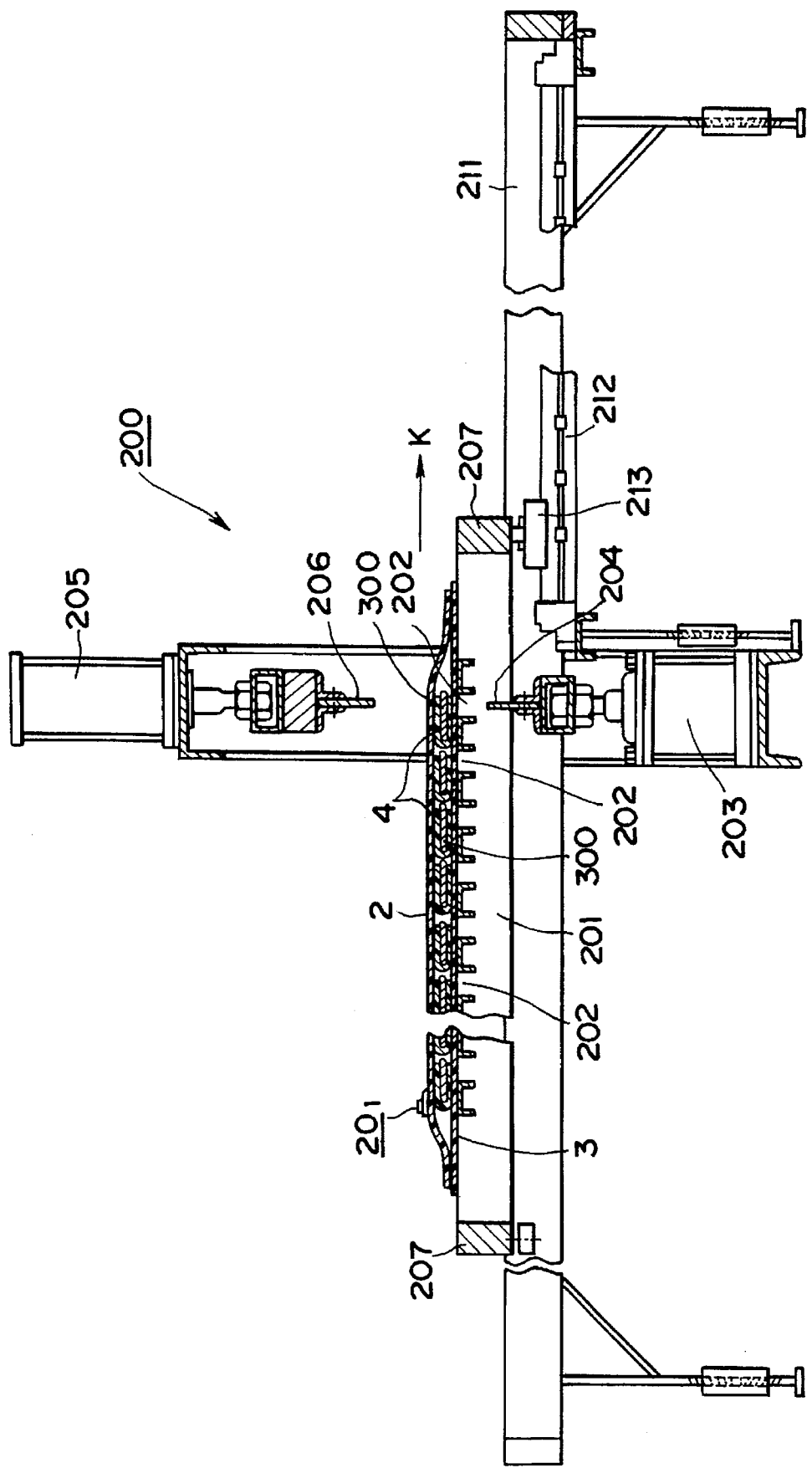
FIG. 25 is a partly-omitted section taken along line J—J of FIG. 24.
Figure 26:
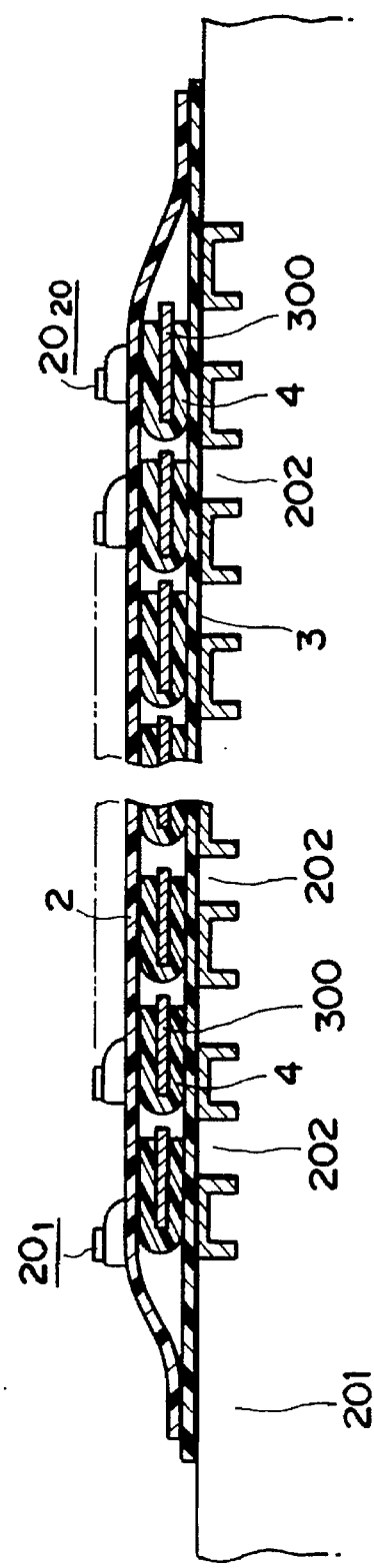
FIG. 26 is a partly enlarged view of FIG. 25 and depicts the third step of the manufacturing method according to the present invention.

In the third step of the air mat manufacturing method shown in FIG. 24 and FIG. 25, a rearside sheet material 3 is placed on a double high frequency welding apparatus 200 at a predetermined position of a tray 201 having a number of slit portions 202 arranged at a predetermined regular distance, as well as a plurality of partition sheet materials 4 sandwiching non-weldable thin plate members (for example, a thin plate of 0.5 to 1.0 m/m thickness of duralumin and the like) in order to prevent the top and bottom edge portions 5, 6 from coming into contact with and welding to each other re folded double through the bending line 7 and placed on the rearside sheet material 3 at a predetermined regular interval so as to place the welding portions 5,6 of the partition sheet materials 4 to the outside and the rearside sheet materials 2, 3 at respective slit portions 202. Further, the outside sheet material 2 treated in the second step is placed as shown in FIG. 26 on these partition sheet material 4 so as to set the related positions of the rearside sheet material and respective partition sheet material 4 and the outside sheet material 2 to each other.

Figure 27:
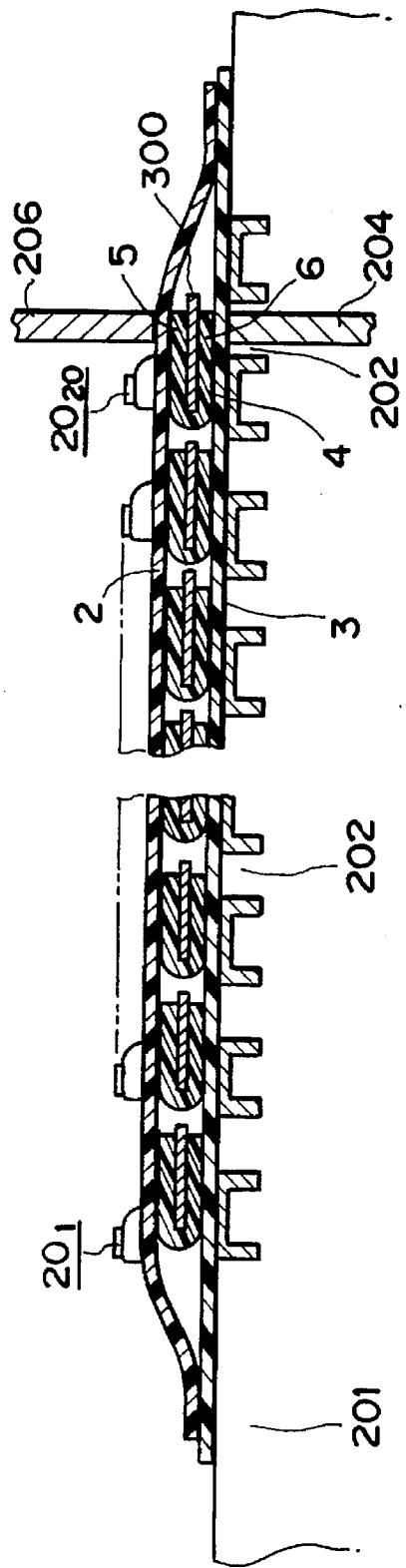
FIG. 27 and FIG. 28, respectively are partly-omitted sectional views depicting the fourth step of the manufacturing method according to the present invention.
Figure 28:
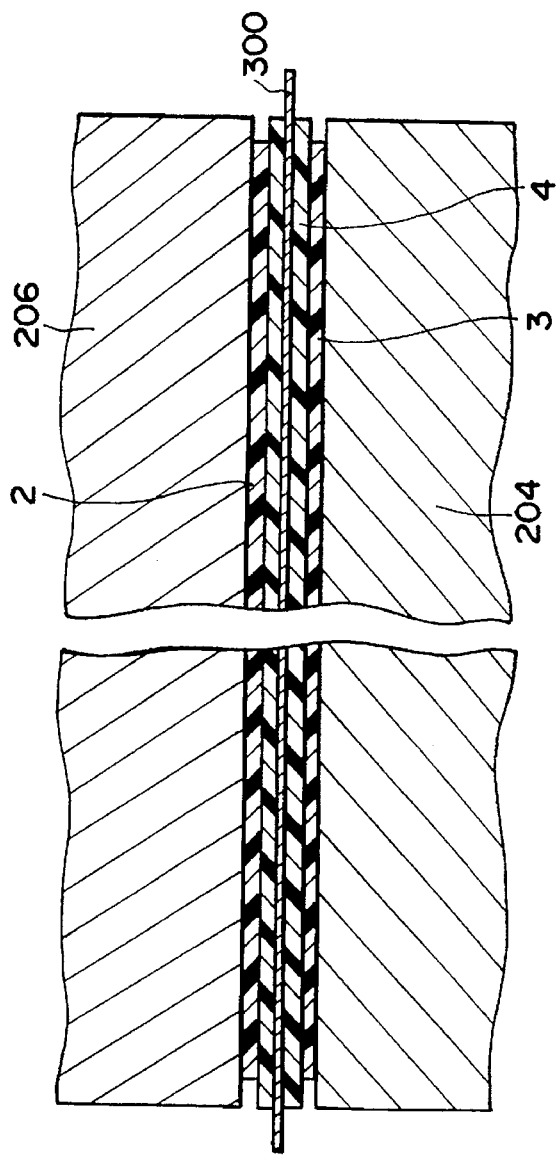
Figure 29:
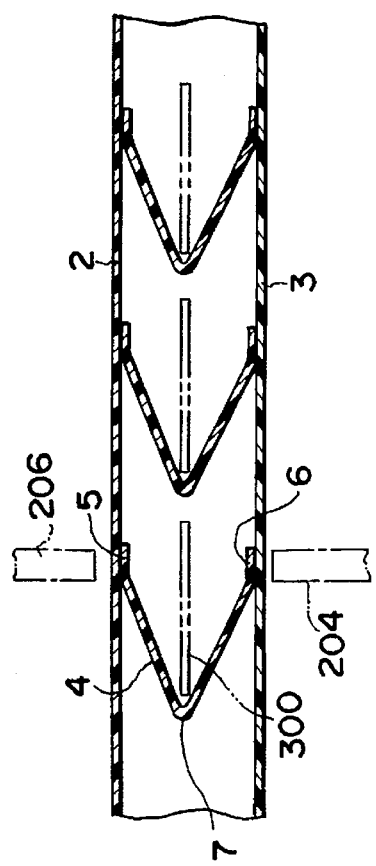
FIG. 29 is a partly enlarged sectional view for still explaining the fourth step of the air mat manufacturing method according to the present invention.

The fourth step uses the upper and the lower electrodes of the double high frequency welding apparatus 200 sequentially welding longitudinal upper edge portions 5 of respective partition materials 4 and outside sheet material 2, and rearside sheet material 3 and longitudinal lower edge portions 6 of respective partition sheet material 4 through respective slit portions 202. Operation of a pair of font and rear lower air cylinders 203 of the double high frequency welding apparatus 200 shown in FIG. 24 and FIG. 25 raises a straight plate-like lower electrode 204 connected to the lower air cylinder 203 to a position of top face of the tray 201, as well as operation of a pair of front and rear upper air cylinders 205 lowers a straight plate-like upper electrode 206 as shown in FIG. 27 and FIG. 28 so as to sandwich outside sheet material 2, partition sheet material 4 and rearside sheet material 3 by means of these upper and lower electrodes 206, 204. Then, high frequency electricity is impressed to weld the upper edge portion 5 of the partition sheet material 4 and the outside sheet material 2 to the lower edge portion 6 of the partition sheet material 4 and the rearside sheet material 3 simultaneously with a completely-same force, and upper and lower edge portions 5, 6 of the partition sheet material 4 are not welded to each other due to a non-weldable thin plate member 300. After the welding operation using both the electrodes, these electrodes 204, 206 return to their original positions and the tray 201 is sent transversely along a solid line K shown in FIG. 25 by a predetermined distance or interval in order to weld the upper and the lower edge portions 5, 6 of next partition sheet material 4 and outside and rearside sheet materials 2, 3. Describing transversal motion of the tray, tray 201 transversely moves by a predetermined distance because that a feed roller 208 and a stabilizer roller 209 respectively fixed on outside of a tray frame 207 facing the tray 201 travel along a pair of rails 211 fixed on innerside of frame stand 2110 and the tray 201 is connected to a table 213 of rodless air cylinder 212 installed on the frame stand at mid position of the rails 211 functioning as a feeding mechanism. Consequently, the tray moves when the table 213 moves. Such welding operation is repeated and all partition sheet materials as shown in FIG. 30 are welded along welding lines 301.

Figure 30:
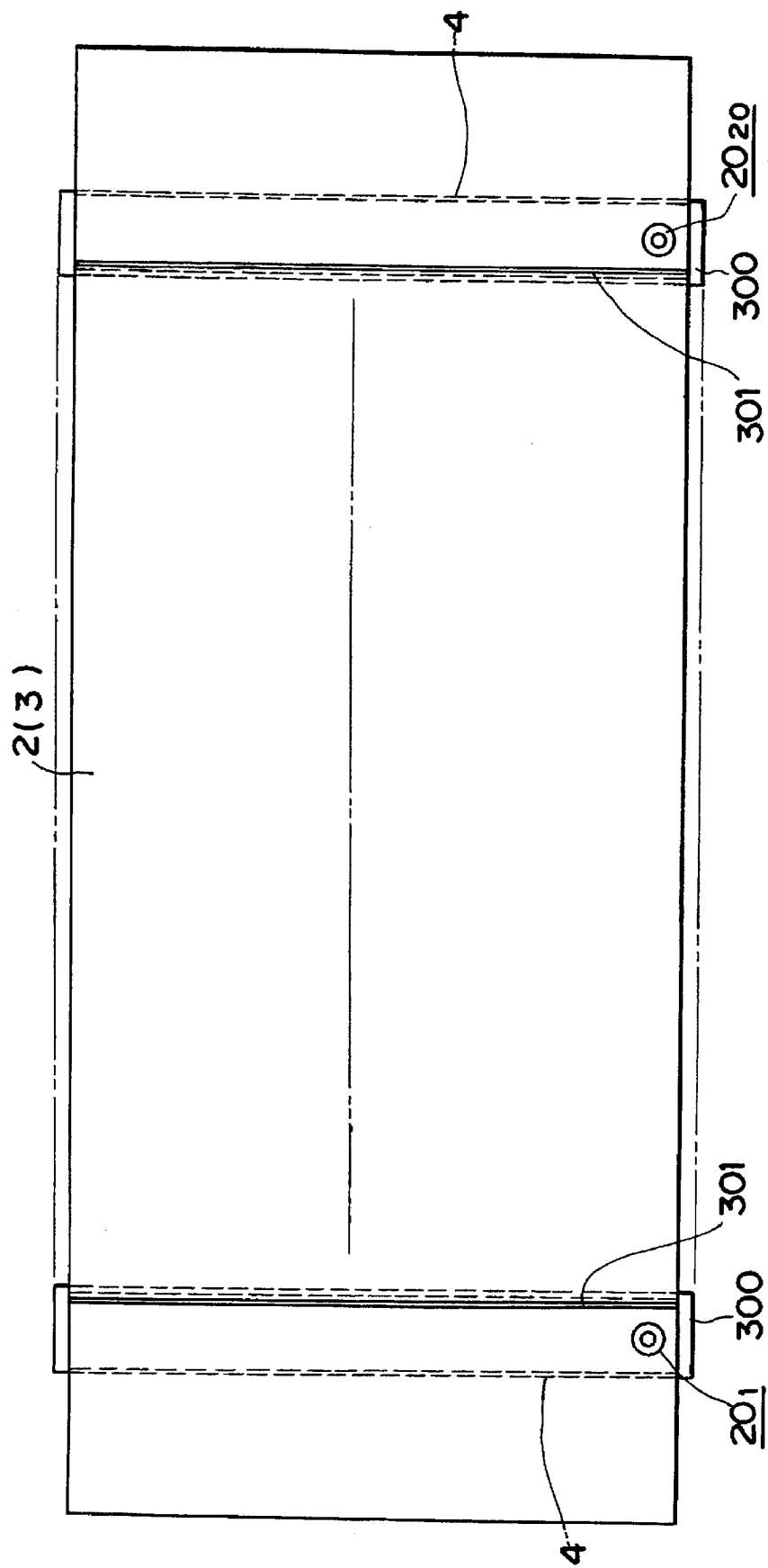
FIG. 30 is a plane explanation view of the fourth step of the manufacturing method according to the present invention.
Figure 31:
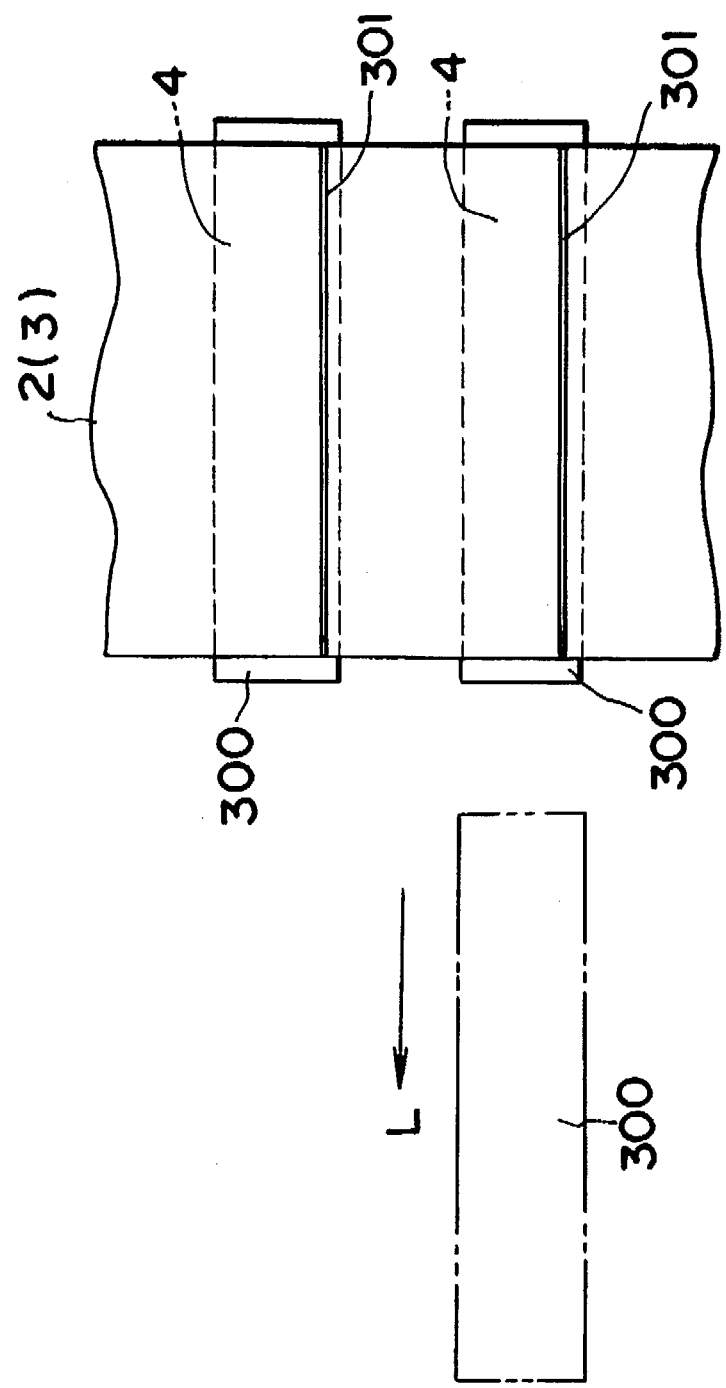
FIG. 31 is a partly-omitted and enlarged plan view depicting the fifth step of the air mat manufacturing method according to the,present invention.

Fifth step is shown in FIG. 30 and FIG. 31 and includes drawing operation of the tray 201 and drawing-out of non-weldable thin plate member 300 inserted in the partition sheet material 4 folded-double along a solid line L. In detail, because the non-weldable thin plate member 300 is a metal plate, it absorbs heat on inner faces of the upper and the lower edge portions 5, 6 of the partition sheet material 4 contacting with the metal plate and it is easy to withdraw cool partition sheet material 4.

Figure 3:
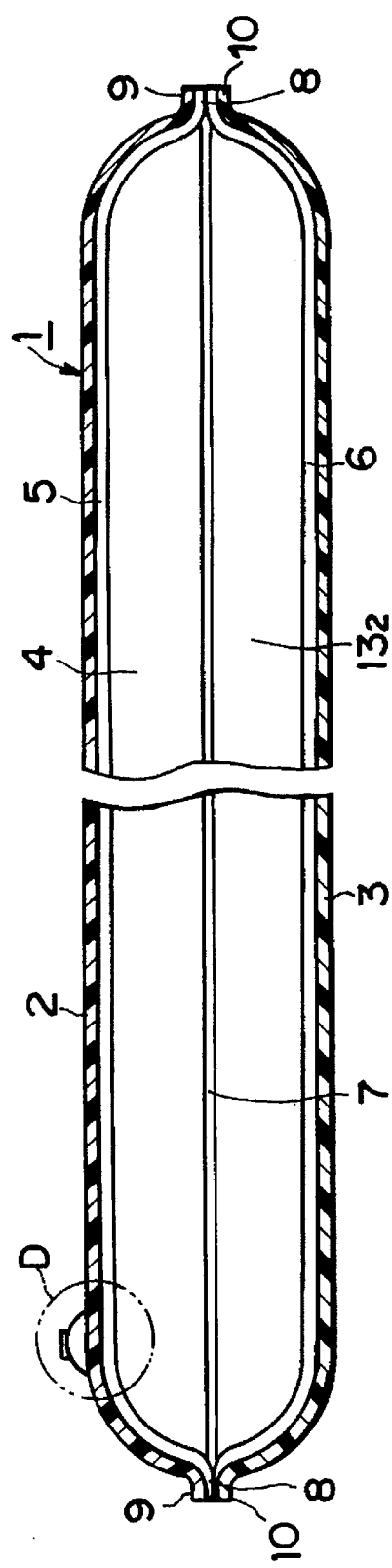
FIG. 3 is an enlarged sectional view of the expanded air mat taken along line 3—3 of FIG. 1.
Figure 4:
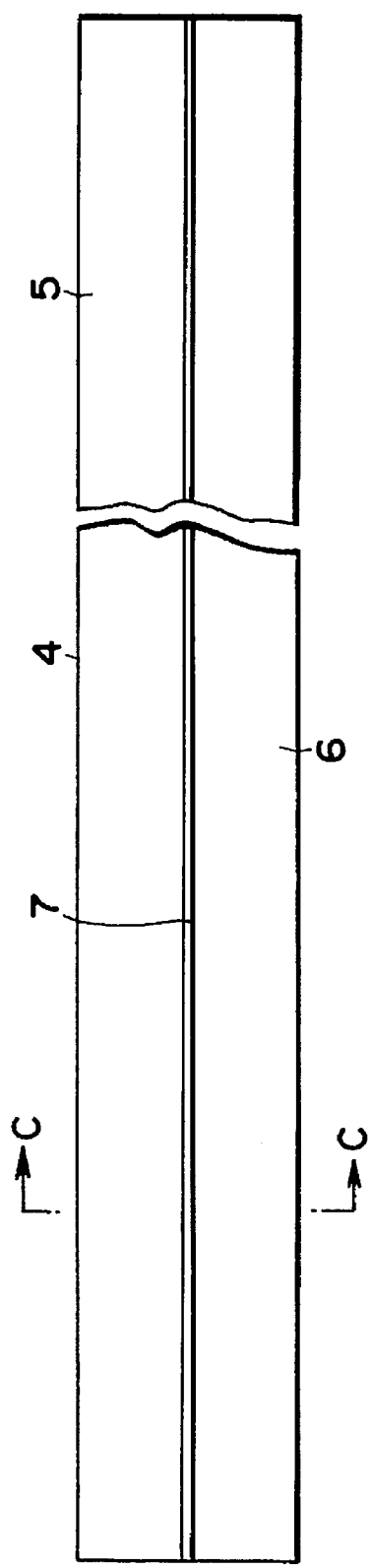
FIG. 4 is an enlarged and partly-omitted sectional view of one example of the partition sheet materials of forming band.
Figure 5:
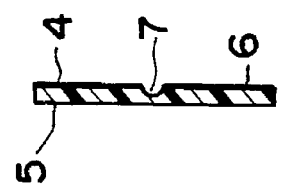
FIG. 5 is a sectional view taken along line C—C of FIG 4.
Figure 6:
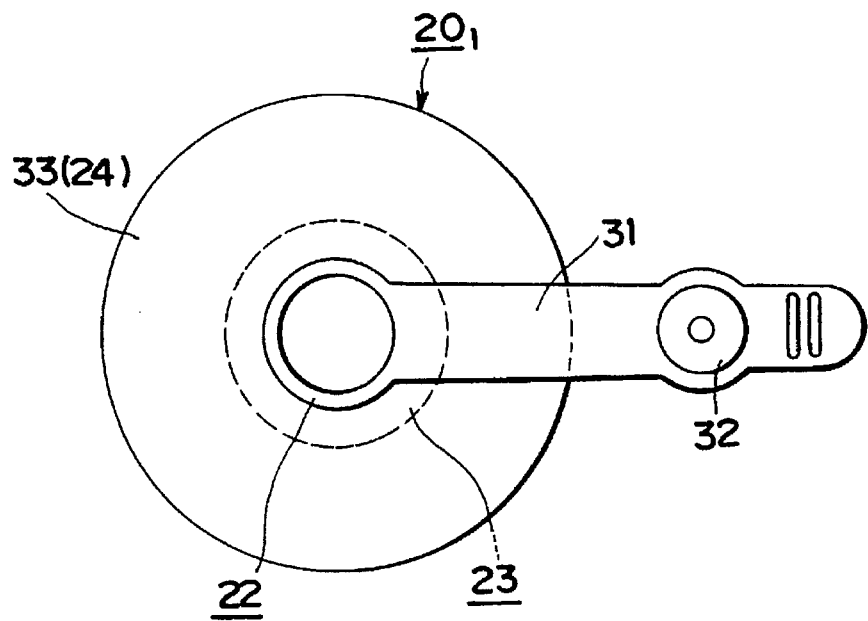
FIG. 6 is a plan view of an air supply and exhaust tap.
Figure 10:
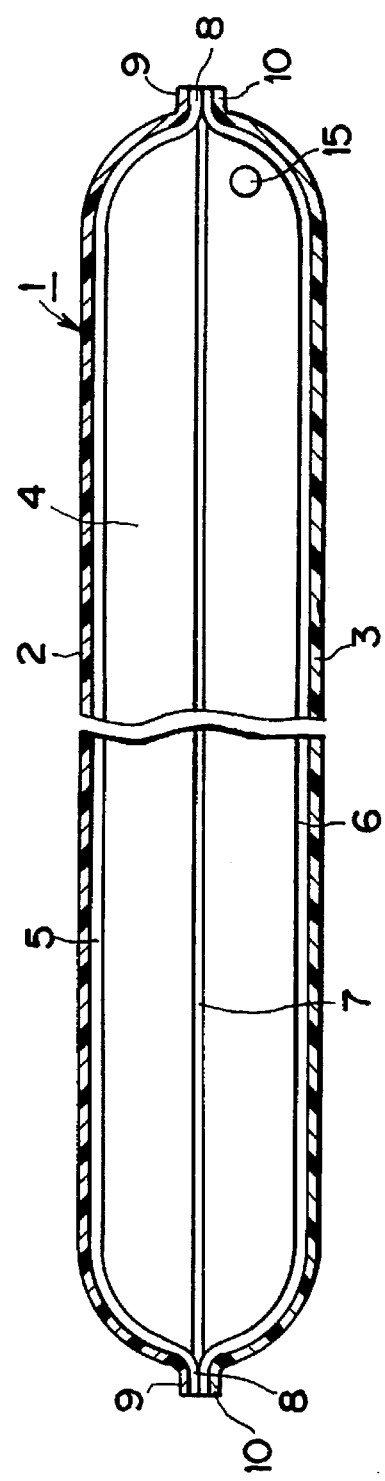
FIG. 10 is a partly-omitted enlarged sectional view of the expanded air mat taken along line 10—10 of FIG. 8.
Figure 11:
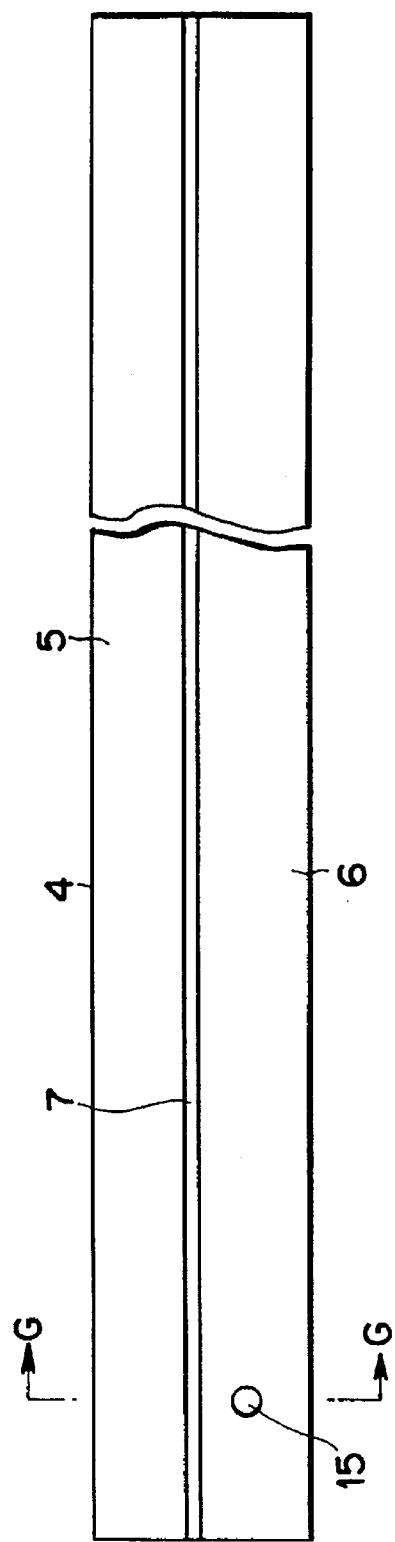
FIG. 11 is a partly-omitted enlarged sectional view showing partition sheet material of forming or shaping band shown in FIG. 8.
Figure 12:
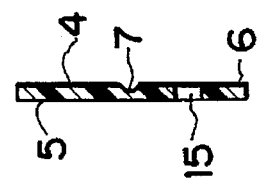
FIG. 12 is a sectional view taken along line G—G of FIG. 11.

According to the sixth step shown in FIG. 3, FIG. 10 and FIG. 32, a conventional high frequency welder (not shown) welds whole circumferential edge portion 302 of the outside and the rearside sheet materials 2, 3 after both end portions 8 of respective partition sheet materials 4 are inserted between both longitudinal end edge portions 9, 10 outside and rearside sheet materials 2, 3. These six steps above manufacture the air mat of the present invention. If necessary, surplus portions of various portions are cut off of the air mat.

According to the manufacturing method for the air mat of the present invention, it is possible to easily mass produce air mats provided with partition sheet materials solving the difficulties of the prior art, and consequently to provide air mats economically.

What we claimed is:

1. An air mat comprising:

an air mat body having a length and width made of outside and rearside sheet materials of non-ventilation soft synthetic resin sheet material and partition sheet materials of shaping bands, both end portions of respective partition sheet materials being sandwiched between said outside and rearside sheet materials at a suitable interval, then whole circumferential portions of said outside and rearside-sheet materials being welded integrally with longitudinal upper and lower edge portions of respective partition sheet materials;

a plurality of independent air chambers arranged transversely to the length of the air mat; and air supply and exhaust taps respectively welded to said independent air chambers of said air mat in order to keep swelled condition of the independent air chambers filled with air by means of air supply means at a pressure of the atmosphere; and wherein the outside and rearside sheet materials of the air mat body further comprise plantations adhesively bonded to each of said non-ventilated soft synthetic resin sheet materials of said outside and rearside sheet material, and the air mat body and the members welded to the air mat body are contained in a bag.

2. An air mat comprising:

an air mat body made of a plurality of ventilation-hole provided partition sheet materials of shaping band and outside and rearside sheet materials made of non-ventilated soft synthetic sheet material, and a plurality of non-ventilation-hole-provide partition sheet materials being sandwiched between the front and rear sheet materials at a suitable interval, then whole circumferential portions of the outside and rearside sheet materials being integrally welded with longitudinal upper and lower edge portions of respective partition sheet materials; and a plurality of air chambers arranged transversely of a person lain on the air mat, said air chambers being independently divided into a plurality of blocks by means of said non-ventilation-hole-provided partition sheet materials; and a plurality of air supply and exhaust taps respectively welded to each air chamber of the plural blocks of the air mat in order to keep a swelled condition of all air chambers of respective blocks at atmospheric pressure, said air chambers being supplied with air by air supply means; and wherein the outside and rearside sheet materials of the air mat body further comprises plantation adhesively bonded to each of said non-ventilated soft synthetic resin sheet materials of said outside and rearside sheet material, and the air mat body and the members welded to the air mat body are contained in a bag.

* * * * *